(12) United States Patent
Maranò et al.

(10) Patent No.: US 9,002,286 B2
(45) Date of Patent: Apr. 7, 2015

(54) METHOD AND SYSTEM FOR IDENTIFICATION AND MITIGATION OF ERRORS IN NON-LINE-OF-SIGHT DISTANCE ESTIMATION

(75) Inventors: Stefano Maranò, Verona (IT); Wesley M. Gifford, Somerville, MA (US); Henk A. H. E. Wymeersch, Boston, MA (US); Moe Z. Win, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1299 days.

(21) Appl. No.: 12/383,939

(22) Filed: Mar. 30, 2009

(65) Prior Publication Data
US 2011/0177786 A1 Jul. 21, 2011

(51) Int. Cl.
*H04B 17/00* (2006.01)

(52) U.S. Cl.
CPC .......... *H04B 17/009* (2013.01); *H04B 17/0067* (2013.01)

(58) Field of Classification Search
CPC .......... H04B 17/009; H04B 17/0067
USPC .......... 455/404.2, 456.1, 456.2, 456.5, 456.6, 455/67.11, 506, 457, 102; 360/75; 342/463, 342/357.73, 458, 385; 375/341, 130, 146, 375/237, 260; 369/44.35; 714/794, 752, 714/758; 370/285, 310, 329, 338; 701/301
See application file for complete search history.

(56) References Cited

U.S. PATENT DOCUMENTS

| | | | |
|---|---|---|---|
| 6,219,561 B1 * | 4/2001 | Raleigh | 455/561 |
| 7,805,079 B1 * | 9/2010 | Meyers et al. | 398/118 |
| 8,103,228 B2 * | 1/2012 | Monat et al. | 455/130 |
| 2002/0186217 A1 * | 12/2002 | Kamata et al. | 345/427 |
| 2004/0248521 A1 * | 12/2004 | Moursund et al. | 455/67.14 |
| 2007/0115173 A1 * | 5/2007 | Nelson | 342/359 |
| 2008/0062921 A1 * | 3/2008 | Lakkis | 370/329 |
| 2009/0069029 A1 * | 3/2009 | Guvenc et al. | 455/456.1 |
| 2009/0243932 A1 * | 10/2009 | Moshfeghi | 342/378 |
| 2010/0066597 A1 * | 3/2010 | Tyree et al. | 342/195 |
| 2010/0103868 A1 * | 4/2010 | Meng et al. | 370/328 |

OTHER PUBLICATIONS

Patwari, N., et al., "Locating the Nodes," *IEEE Signal Processing Magazine*, pp. 54-69 (Jul. 2005).

(Continued)

*Primary Examiner* — Mahendra Patel
(74) *Attorney, Agent, or Firm* — Hamilton, Brook, Smith & Reynolds, P.C.

(57) ABSTRACT

Ultra-wide bandwidth (UWB) transmission is a promising technology for indoor localization due to its fine delay resolution and obstacle-penetration capabilities. However, the presence of walls and other obstacles present a significant challenge in terms of localization, as they result in positively biased distance estimates. Measurement campaigns with FCC-compliant UWB radios can quantify effects of non-line-of-sight (NLOS) propagation. Features of waveforms measured during a campaign can be extracted for use in distinguishing between NLOS and line-of-sight situations in embodiments of the present invention. Embodiments further include classification and regression methods based on machine learning that improve the localization performance while relying solely on the received signal. Applications for systems employing an example embodiment of the invention include indoor or outdoor search and recovery with high accuracy and low cost.

16 Claims, 20 Drawing Sheets

(56) References Cited

OTHER PUBLICATIONS

Gezici, S., et al., "Localization via Ultra-Wideband Radios," *IEEE Signal Processing Magazine*, pp. 70-84 (Jul. 2005).
Win, M. Z., and Scholtz, R. A., "Impulse Radio: How It Works," *IEEE Communications Letters*, 2(2): 36-38 (Feb. 1998).
Win, M. Z., and Scholtz, R. A., "Ultra-Wide Bandwidth Time-Hopping Spread-Spectrum Impulse Radio fro Wireless Multiple-Access Communications," *IEEE Transactions on Communications*, 48(4): 679-691 (Apr. 2000).
Lee, J., and Scholtz, R. A., "Ranging in a Dense Multipath Environment Using an UWB Radio Link," *IEEE J. on Selected Areas in Communications*, 20(9): 1677-1683 (Dec. 2002).
Molisch, A. F., "Propogation Mechanisms," *Wireless Communications*, $1^{st}$ ed., pp. 45-52, Piscataway, New Jersey, 08855-1331, IEEE Press, J. Wiley and Sons, 2005.
Borràs, J., et al., "Decision Theoretic Framework for NLOS Identification," in *Proc. IEEE Semiannual Veh. Technol. Conf.*, Ottawa, Canada, vol. 2, pp. 1583-1587, (May 1998).
Schroeder, J., et al., "NLOS Detection Algorithms for Ultra-Wideband Localization," $4^{th}$ *Workshop on Positioning, Navigation and Communication* 2007 (*WPNC '07*), Hannover, Germany, pp. 159-166 (Mar. 2007).
Gezici, S., et al., "Non-Parametric Non-Line-of-Sight Identification," in *Proc. IEEE Semiannual Veh. Technol. Conf.*, Orlando, Florida, vol. 4, pp. 2544-2548, (Oct. 2003).
Guvenc, I., et al., "NLOS Identification and Mitigation for UWB Localization Systems," in *Proc. IEEE Wireless Commun. and Networking Conf.*, Kowloon, Hong Kong, pp. 1573-1578, (Mar. 2007).
Benedetto, F., et al., "Dynamic LOS/NLOS Statistical Discrimination of Wireless Mobile Channels," Vehicular Technology Conference, pp. 3071-3075, (Apr. 2007).
Tüchler, M., and Huber, A., "An improved algorithm for UWB-based positioning in a multi-path environment," 2006 International Zurich Seminar on Communications, pp. 206-209, (Feb. 2006).
Chen, C., "A Non-Line-of-Sight Error Mitigation Algorithm in Location Estimation," in *Proc. IEEE Wireless Commun. and Networking conf.*, vol. 1, pp. 316-320, (Sep. 1000).
Casas, R., et al., "Robust Estimator for Non-Line-of-Sight Error Mitigation in Indoor Localization," *EURASIP J. of Applied Signal Processing*, 2006(43429): 1-8 (Nov. 2005).
Oppermann, I., et al., "UWB: Theory and Applications," pp. 188-194, Wiley 2004.
Denis, B., and Daniele, N., "NLOS Ranging Error Mitigation in a Distributed Positioning Algorithm for Indoor UWB Ad-Hoc Networks," *2004 International Workshop on Wireless Ad-Hoc Networks*, pp. 356-360 (May 2004).
Venkatesh, S., and Buehrer, R. M., "A Linear Programming Approach to NLOS Error Mitigation in Sensor Networks," *IPSN '06*, 301-308 (Apr. 19-21, 2006).
Venkatraman, S., et al., "Location Using LOS Range Estimation in NLOS Environments," *Vehicular Technology Conference, 2002, VTC Spring, IEEE 55th*, vol. 2, pp. 856-860 (Aug. 2002).
Sayed, A. H., et al., "Network-Based Wireless Location," *IEEE Signal Processing Magazine*, 24-40 (Jul. 2005).
Al-Jazzar, S., and Caffery, Jr., J., "NLOS Mitigation Method for Urban Environments," *Vehicular Technology Conference, 2004. VTC 2004-Fall. 2004 IEEE 60th*, vol. 7, pp. 5112-5115 (Sep. 2004).
Schroeder, J., et al., "Three-dimensional indoor localization in Non Line of Sight UWB Channels,"in *Proc. of IEEE Int. Conf. on Ultra-Wideband (ICUWB)*, Singapore, pp. 89-93 (Sep. 2007).
Time Domain Corporation, "P210 Reference Design," Data Sheet, (no date given).
Molisch, A. F., et al., "IEEE 802.15.4a Channel Model—Final Report," 2005. [Online]. Available: ftp://ftp.802wirelessworld.com/ 15/05.
Federal Communications Commission, Revision of part 15 of the commission's rules regarding ultra-wideband transmission systems, first report and order., Adopted Aug. 20, 1998. Released Sep. 1, 1998.
Schantz, H. G., "Botton Fed Planar Elliptical UWB Antennas,", *2003 IEEE Conference on Ultra Wideband Systems and Technologies*, pp. 219-223, (Nov. 2003).
Suykens, J. A. K. and Vandewalle, J., "Least Square Support Vector Machine Classifiers," Neural Processing Letters, 9(3):293-300, (Jun. 1999).
Suykens, J. A. K., et al., "Basic Methods of Least Squares Support Vector Machines," *World Scientific*, pp. 71-100, (2002).
Cortes, C. and Vapnik, V., "Support-Vector Networks," *Machine Learning*, 20(2):273-297, (Mar. 1995).
Güvenc, I., et al., "NLOS Identification and Weighted Least-Squares Localization for UWB Systems Using Multipath Channel Statistics," *EURASIP J. on Advances in Signal Processing*, (271984): pp. 1-14, (Jan. 2008).

\* cited by examiner

METHOD AND SYSTEM FOR IDENTIFICATION AND MITIGATION OF ERRORS IN NON-LINE-OF-SIGHT DISTANCE ESTIMATION

GOVERNMENT SUPPORT

The invention was supported, in whole or in part, by grants ANI-0335256 and ECCS-0636519 from the National Science Foundation and Young Investigator Award N00014-1-0489 from the Office of Naval Research. The Government has certain rights in the invention.

BACKGROUND OF THE INVENTION

Location-awareness is fast becoming a fundamental aspect of wireless networks and will enable a myriad of applications, in both the commercial and the military sector. Localization in harsh environments and accuracy-critical applications requires robust signaling, through-wall propagation, and high-resolution ranging capabilities, such as ultra-wide bandwidth (UWB) transmission, which operates in the 3 to 10 GHz band. In practical scenarios, however, a number of challenges remain before UWB localization and communication can be deployed.

SUMMARY OF THE INVENTION

Embodiments of the present invention include methods of and apparatuses for characterizing a medium comprising learning a function that is nonparametric with respect to features representing aspects of a waveform transmitted between two wireless devices. In alternative embodiments, the function may be feature-based, i.e., based on features of transmitted waveforms. The medium is characterized by evaluating the function with a feature vector extracted from a waveform received at a first wireless device from a second wireless device. Function evaluation yields information about the waveform, including, but not limited to: an estimate of the distance between the first and second wireless devices; a decision regarding a presence of an obstruction between the first and second wireless devices; a likelihood of an obstruction between the first and second wireless devices; an estimate of distance estimation error; and a distribution of distance estimation error.

This information may be reported to a user or a module configured to use the reported information. For example, the module may be configured to mitigate distance estimate error by subtracting the distance estimate error from the distance estimate.

In further embodiments, the function is learned using machine learning techniques, such as support vector machine techniques or Gaussian processes techniques. Functions may be chosen from a classes of functions including, but not limited to, polynomials and linear combinations of kernel functions. Learning may include accessing data in a training database, including line-of-sight/non-line-of-sight labels and feature vectors representing aspects of a waveform transmitted between at least one pair of wireless devices. The training database may be assembled from waveforms transmitted between pairs of wireless devices distributed throughout a model environment.

Embodiments may employ first and second wireless devices that are matched pairs of wireless devices with compatible transceivers. Features representing aspects of a waveform include, but are not limited to: estimated distance; energy of a received signal; maximum amplitudes; rise time; mean excess delay; root-mean-square delay spread; and kurtosis. In some embodiments, all the features may be extracted from the received waveform; in other embodiments, features may include information from other sources, such a priori information about the environment or the transmitted waveform.

Further embodiments include methods of and apparatuses for supporting distance estimation between wireless devices. Example methods include evaluating an identification function to determine a presence or likelihood of an obstruction between wireless devices. A mitigation function can be evaluated based on a result of evaluating the identification function. Results of evaluating the mitigation function may then be used to provide an estimate of distance estimation error (or distribution of distance estimation error) of an estimate of a distance between wireless devices to support distance estimation between wireless devices.

The identification and mitigation functions may learned using machine learning techniques. In certain instances, the identification function may be learned using an identification training database that includes at least line-of-sight/non-line-of-sight labels of waveforms received in a training environment. The mitigation function may be learned using a mitigation training database that includes at least true distances of waveforms received in a training environment. The identification and mitigation training databases may be coupled to identification and mitigation units, respectively; they may, in fact, be the same database.

For example, evaluating the identification function may include providing labels identifying a received waveform as being line-of-sight (LOS) or non-line-of-sight (NLOS); these labels may be used to determine whether to evaluate the mitigation function. Still further embodiments may correct the estimate of the distance between wireless devices based on results of evaluating the mitigation function. Similarly, the estimate of distance estimation error (or distribution of distance estimation error) may be used to localize a wireless device.

In example embodiments, evaluating the identification and mitigation functions occurs in one of plural layers in a communications network between wireless devices. The estimate or distribution of distance estimation error may be forwarded to a different layer in the communications network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Example embodiments of the present invention compensate for non-line-of-sight (NLOS) propagation effects that corrupt measurements made using high-resolution localization systems. Typically, NLOS propagation introduces positive biases in distance estimation calculations, thus seriously affecting the localization performance. Typical harsh environments, such as enclosed areas, urban canyons, or under trees canopies, inherently have a high occurrence of NLOS situations. It is therefore useful to understand the impact of NLOS conditions on localization systems and to develop techniques that counter their effects.

A generic localization system comprises two stages: a ranging stage and a localization stage. In the ranging stage, signals are exchanged between UWB devices, based on which relative angles or distances can be estimated. Ranging is often based on estimating the time of arrival (TOA) or the round-trip time of arrival (RTOA) of a packet. Based on the TOA or the RTOA, the distance can be inferred when the signal propagation speed is known. When the direct line-of-sight (LOS) path between the devices is unobstructed, this velocity can be assumed to be constant. On the other hand, under NLOS conditions, the direct signal path is obstructed, so the signal arrives either by propagation through a material or via a reflected path. In both cases, the distance estimate is positively biased. In the former case, this bias is due to reduced propagation speed, which depends on material permittivity and permeability, both of which can be frequency-dependent. In the latter case, the bias is due to the spatial configuration of reflectors.

Example embodiments of the present invention include identification and mitigation methods and systems to deal with ranging bias in NLOS conditions. For instance, disclosed identification methods include a non-parametric approach to non-line-of sight (NLOS) identification based on machine learning. Because these embodiments are based on machine learning, they (i) do not require a statistical characterization of line-of-sight (LOS) and NLOS channels; (ii) are based on the ultrawideband (UWB) channel impulse response (CIR), and thus avoid any latency issues; and (iii) perform identification and mitigation under a common framework. Further, the disclosed techniques are based on an extensive UWB measurement campaign performed in a typical office environment with FCC-compliant UWB radios, not on statistical channel models, so the results shown in FIGS. 9-14 realistically indicate real-world performance.

Figure 1:
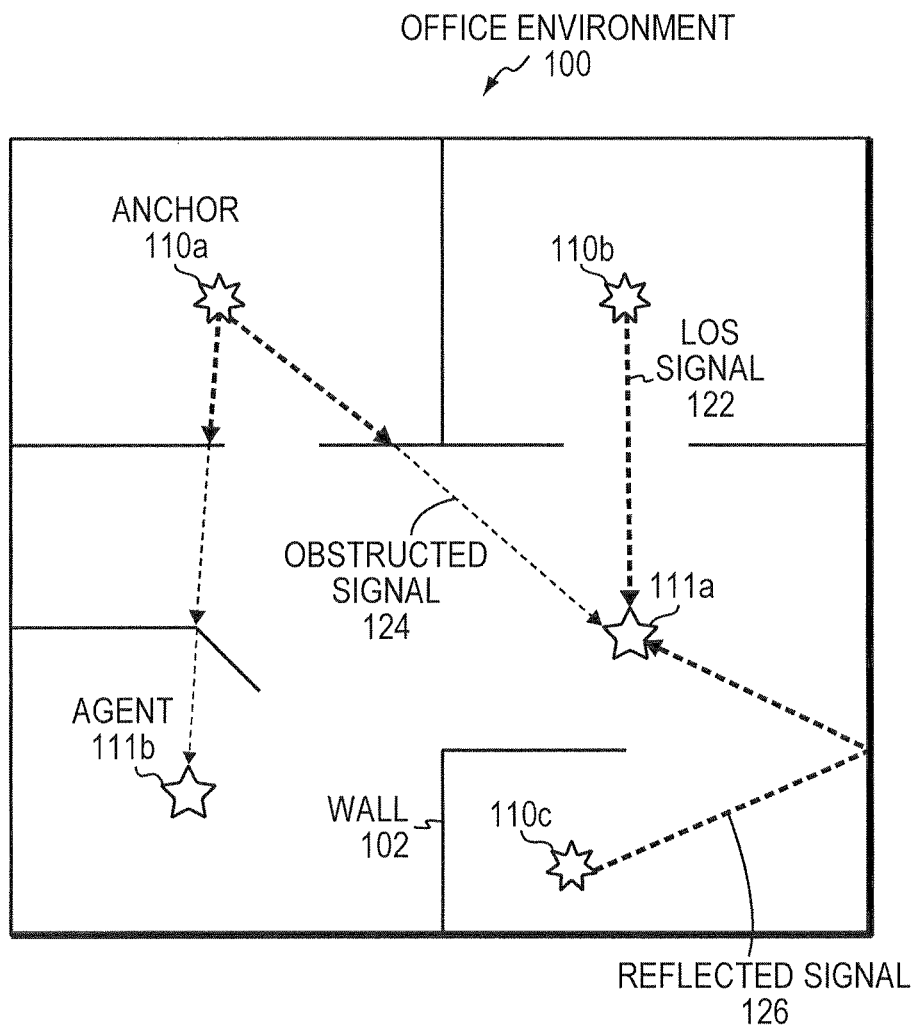
FIG. 1 is a schematic diagram illustrating an example wireless network that provides identification and mitigation for errors in non-line-of-sight (NLOS) distance estimation in an indoor office environment.

FIG. 1 is a diagram of a floor plan of an indoor office environment 100 featuring various wireless devices that employ NLOS identification and mitigation. The wireless devices may be, for example, associated with individual firemen during a search and rescue mission. Fixed wireless devices, or anchors 110a-c, may have known positions. Mobile wireless devices, or agents 111a and 111b, typically have unknown positions.

In preferred embodiments, the anchors 110a-c and agents 111a, 111b can transmit and receive wideband signals, including UWB signals. A given pair of wireless devices may exchange wideband signals to determine their separation distance by multiplying the measured the round-trip signal propagation time by the signal propagation speed, c. Agents 111a and 111b may use distance estimates to three or more anchors 110a-c to localize their positions within the network.

These signals may be LOS signals, such as an LOS signal 122, which propagates along an unobstructed path directly from the anchor 110b to the agent 111a. Wireless devices may also transmit and receive NLOS signals obstructed by walls 102 or other obstacles, such as an obstructed signal 124 transmitted from the anchor 110a to the agent 111a. Because the obstructed signal 124 travels at lower speed through the obstacle than through air, the corresponding distance estimate is too big. NLOS signals may also include signals that follow indirect paths between wireless devices, such as reflected signal 126 transmitted from the anchor 110c to the agent 111a. For the reflected signal 126, the signal propagation distance is greater than the straight-line separation, so the estimated distance is again too big.

Wireless devices 110a-110e of the present invention can identify NLOS signals as such and mitigate the effects of obstacles, reflections, etc., on received signal. For example, identification and mitigation can be used to more accurately estimate distances between pairs of wireless devices or to more accurately localize a wireless device using any three other wireless devices.

Figure 2A:
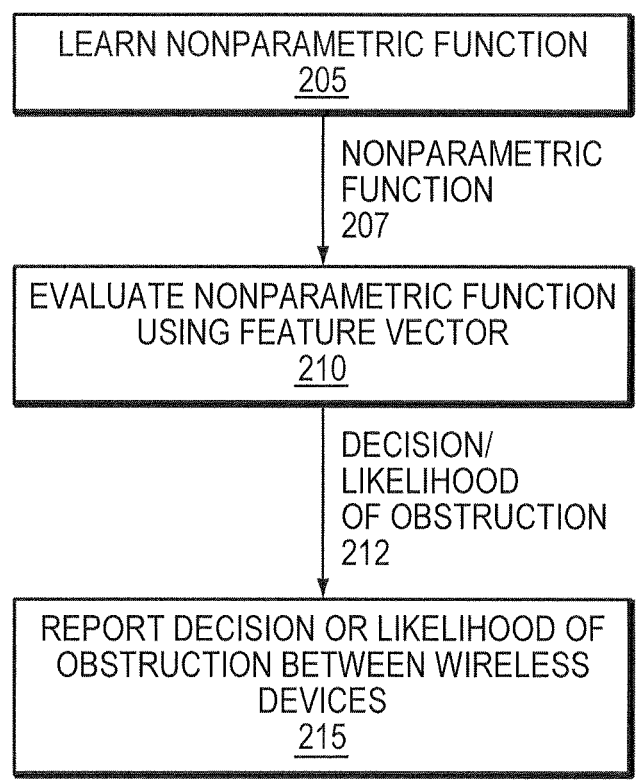
FIG. 2A is a flow diagram illustrating learning and evaluating a nonparametric function to report decisions relating to a presence of obstructions between wireless devices according to embodiments of the present invention.

FIG. 2A is a flow diagram illustrating learning (205) and evaluating (210) a nonparametric function 207 according to embodiments of the present invention. In preferred embodiments, the nonparametric function 207 is learned (205) using machine learning techniques, such as support vector machine (SVM) or Gaussian processes. Evaluating (210) the nonparametric function 207 yields a decision regarding or likelihood of the presence of an obstacle 212. This decision or likelihood 212 is reported (215), possibly to a user, another wireless device, or a different physical or logical layer in a wireless network including multiple wireless devices.

Figure 2B:
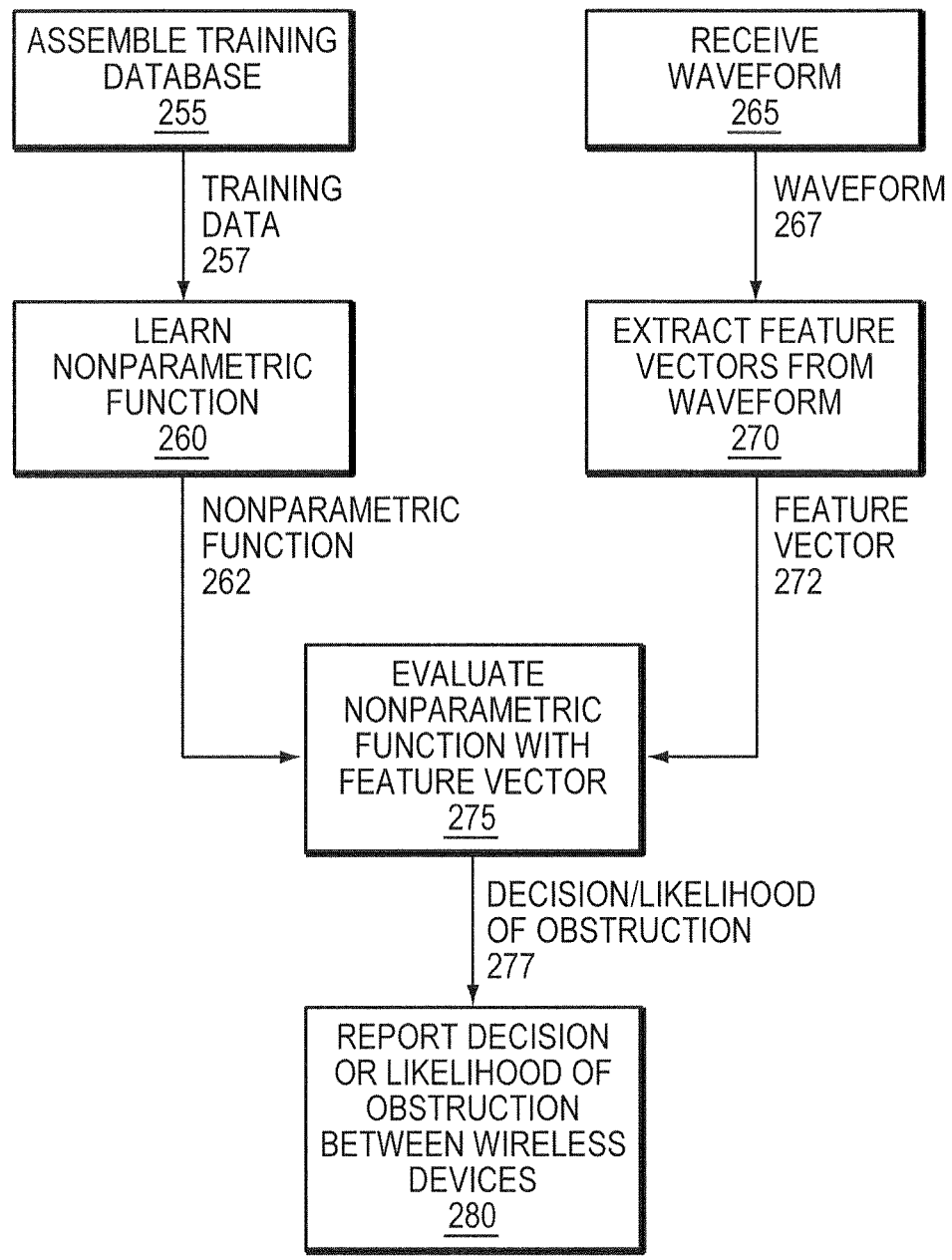
FIG. 2B is a flow diagram illustrating learning and evaluating a nonparametric function to report decisions relating to a presence of obstructions between wireless devices according to alternative embodiments of the present invention.

FIG. 2B is a flow diagram illustrating learning (260) and evaluating (275) a nonparametric function 262 according to alternative embodiments of the present invention. In this example, a training database is assembled (255) from measurements of signals, or waveforms, transmitted between pairs of prototype wireless devices (or perhaps other devices altogether) at different locations throughout a training environment, such as an indoor office environment. The training database includes information about received waveforms including, but not limited to: estimated distance between wireless devices; received energy; maximum amplitude of the received waveform; waveform rise time; mean excess delay; root-mean-square (RMS) delay spread; and kurtosis. The training database may also include actual distance measurements and NLOS/LOS condition information.

Training data 257 is used to learn (260) a nonparametric function 262 using machine learning techniques, such SVMs or Gaussian processes. Once learning (260) ends, the training database does not have to be accessed again, although it may be used to further refine function performance or to learn a different function.

When learning (260) is complete, the nonparametric function 262 may be used to evaluate waveforms 267 received (265) at a wireless device. Feature vectors 272 are extracted (270) from the received waveform 267; example feature vectors 272 may include, but are not limited to: estimated distance between wireless devices; received energy; maximum amplitude of the received waveform; waveform rise time; mean excess delay; RMS delay spread; and kurtosis.

The extracted feature vector 272 is used to evaluate (275) the nonparametric function 262, possibly according to the further description below. Evaluating (275) the nonparametric function 262 may yield either a decision regarding the presence of an obstacle between wireless devices or a probability that such an obstacle exists 277. This decision or likelihood 277 is reported (280), possibly to a user, another wireless device, or a different physical or logical layer in a wireless network including multiple wireless devices.

In some embodiments, once the function is learned, no more training occurs. Learning is done once, during development of the wireless device, on a different computer than the wireless device itself. Function evaluation (275), however, is done by the wireless device every time a waveform is received during normal operating conditions. To speed processing, the function may be evaluated (275) for new incoming signals only.

Figure 3A:
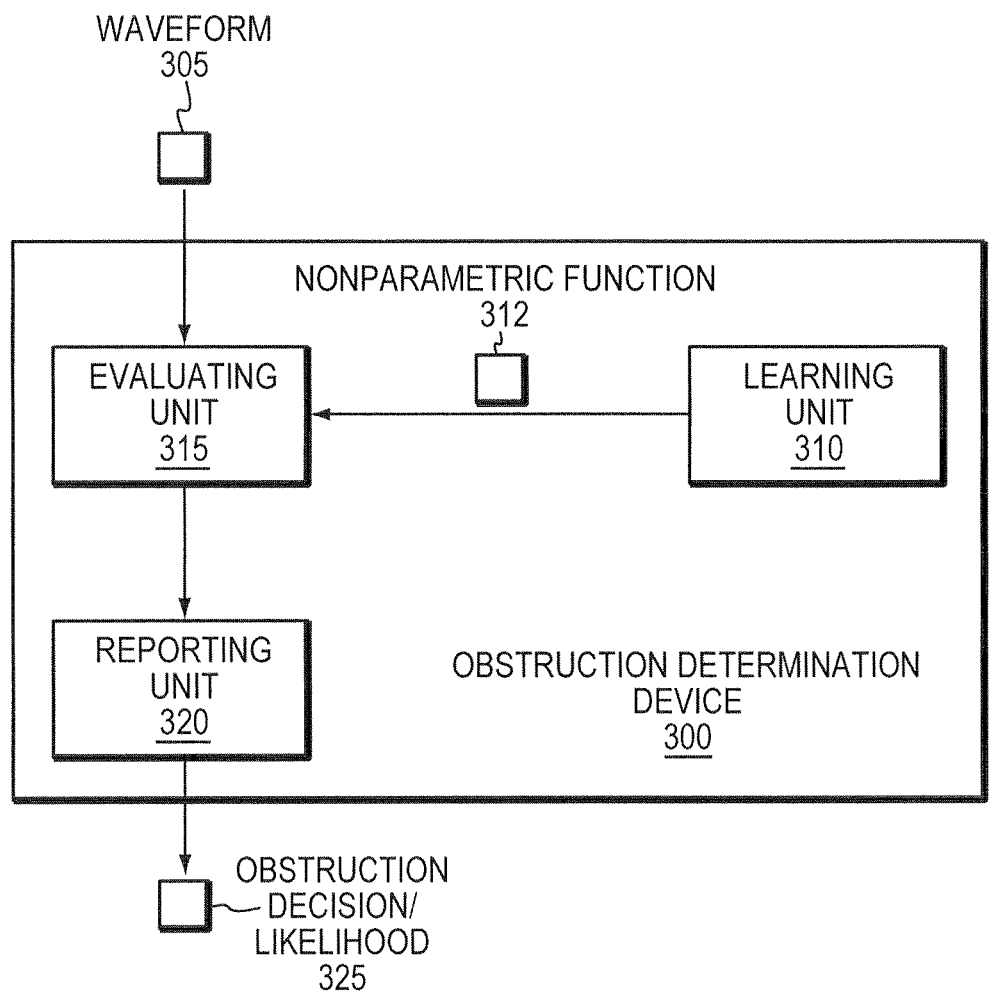
FIG. 3A is a block diagram illustrating an obstruction determination apparatus according to embodiments of the present invention.

FIG. 3A is a block diagram illustrating an obstruction determination device 300 according to embodiments of the present invention. The obstruction determination device 300, which may operate according to the flow diagrams shown in FIGS. 2A and 2B, learns a nonparametric function 312 with a learning unit 310 using machine learning techniques. The learning unit 310 forwards the learned nonparametric function 312 to an evaluating unit 315, which evaluates a feature vector extracted from a received waveform 305 using the nonparametric function 312. The evaluating unit 312 produces a decision 325 regarding the presence of an obstacle in the waveform's path (or possibly a probability of the presence of an obstacle in the waveform's path) and forwards the decision 325 (or probability) to a reporting unit 320. The reporting unit 320 forwards the decision to a user, processor, different wireless device, or different layer in the wireless network through which the waveform 305 was transmitted.

Figure 3B:
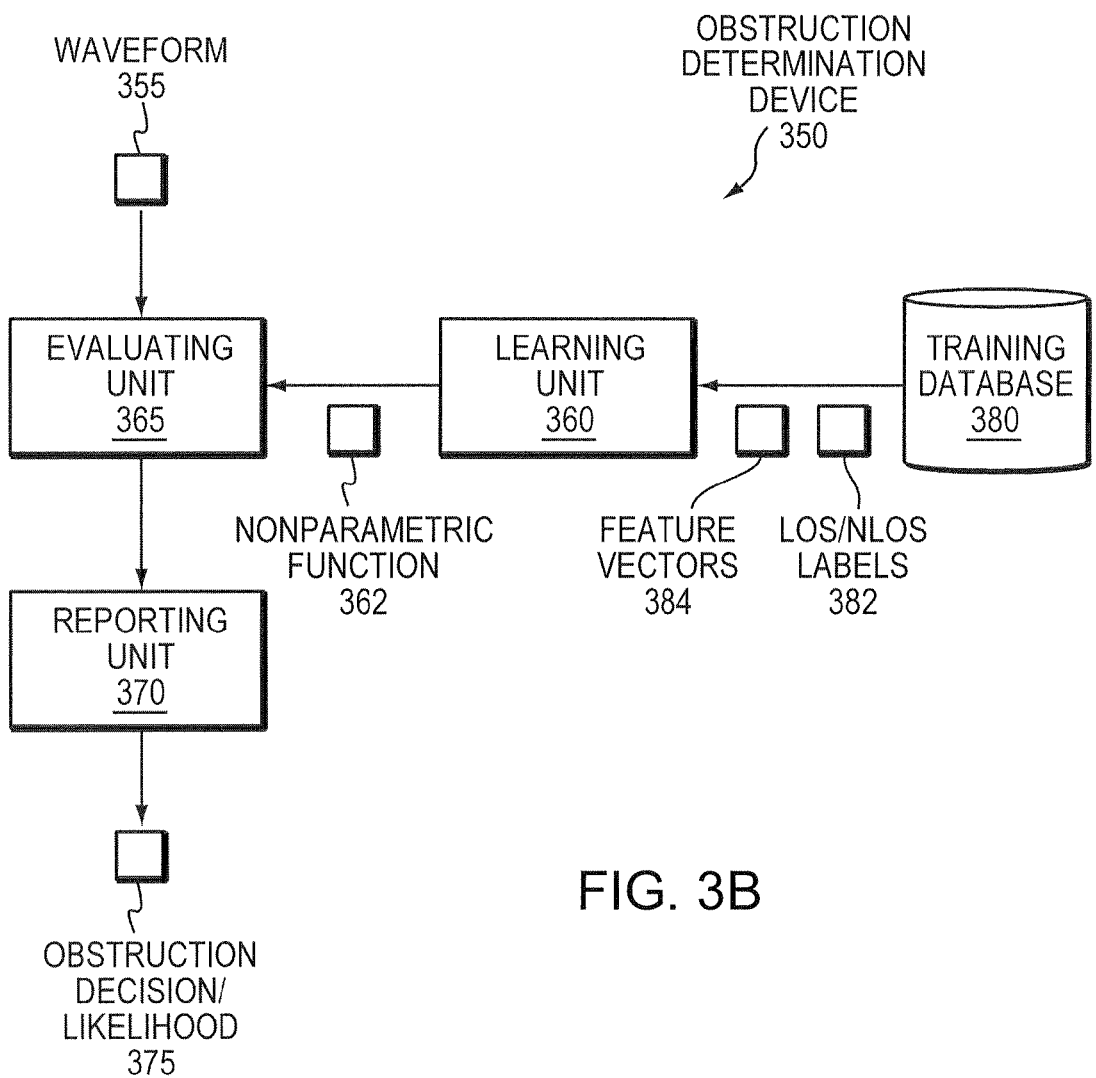
FIG. 3B is a block diagram illustrating an alternative obstruction determination apparatus according to embodiments of the present invention.

FIG. 3B is a block diagram illustrating an alternative obstruction determination apparatus 350 according to embodiments of the present invention. As shown in FIG. 3B, a learning unit 360 receives training data, including LOS/NLOS labels 382 and feature vectors 384, from a training database 380. Example feature vectors 384 may include information collected from training signals, such as: estimated distance between wireless devices; received energy; maximum amplitude of the received waveform; waveform rise time; mean excess delay; RMS delay spread; and kurtosis.

The learning unit 360 uses the training data to learn a nonparametric function 362 using machine learning techniques, such as SVMs or Gaussian processes. The learning unit 360 forwards the learned nonparametric function 362 to an evaluating unit 365, which evaluates the function 362 for a feature vector extracted from a waveform 355. By evaluating the function 362 for a given feature vector, the evaluating unit 360 determines whether an obstacle obstructed the waveform's path. The evaluating unit 362 forwards a decision or probability 375 regarding obstacles in the waveform's path to a reporting unit 370, which may forward the decision or probability 375 to a user, different module, different layer, or memory.

Figure 4A:
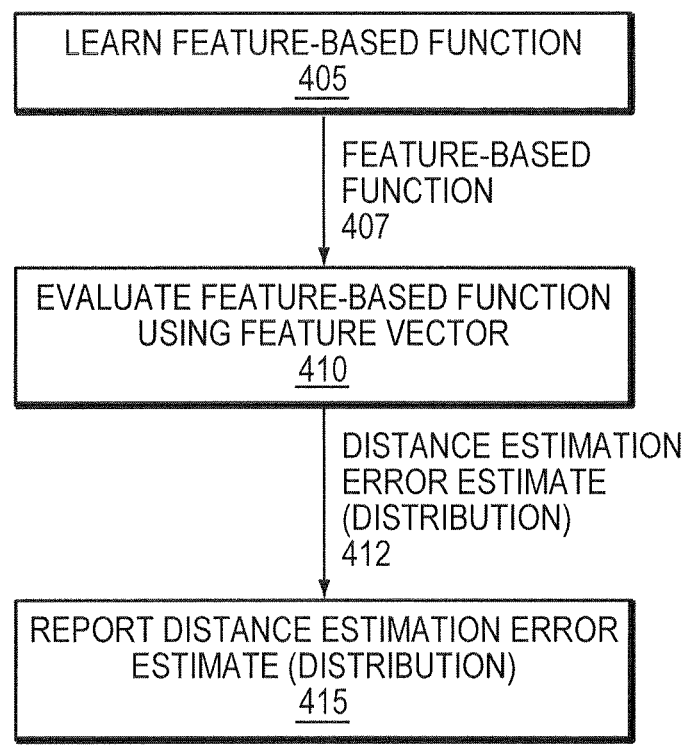
FIG. 4A is a flow diagram illustrating learning and evaluating a feature-based function to report decisions relating to a presence of obstructions between wireless devices according to embodiments of the present invention.

FIG. 4A is a flow diagram illustrating learning (405) and evaluating (410) a feature-based function 407 according to embodiments of the present invention. In preferred embodiments, the feature-based function 407 is learned (405) using machine learning techniques, such as support vector machine (SVM) or Gaussian processes. Evaluating (410) the feature-based function 407 yields an estimate of distance estimation error or a distribution of a distance estimation error 412. The estimate of the distance estimation error 412 may be derived from the distribution of the distance estimation error; for example, it may be the mean or median of the distribution. This error or distribution 412 is reported (415), possibly to a user, another wireless device, or a different physical or logical layer in a wireless network including multiple wireless devices.

Figure 4B:
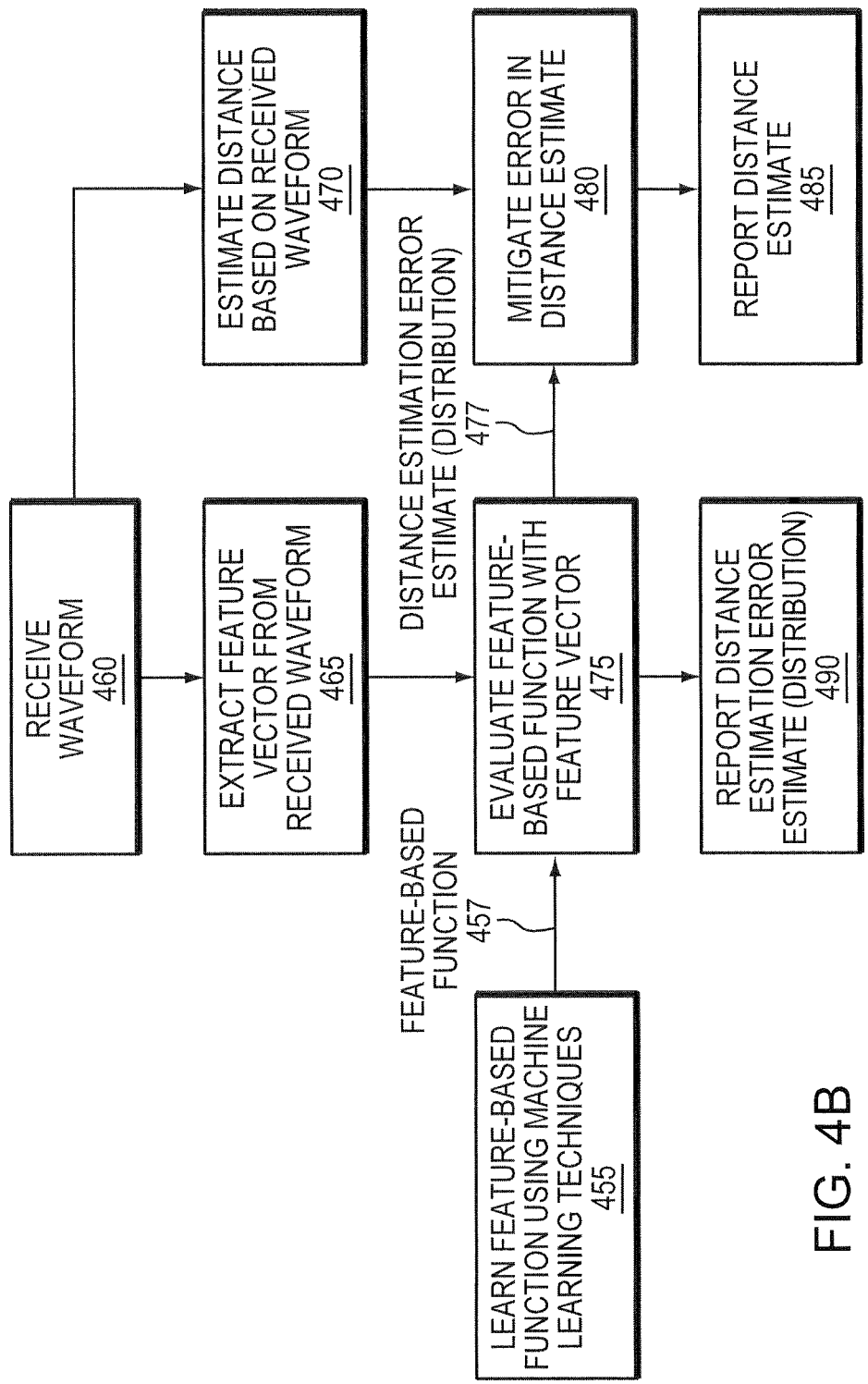
FIG. 4B is a flow diagram illustrating learning and evaluating a feature-based function to report decisions relating to a presence of obstructions between wireless devices according to alternative example embodiments of the present invention.

FIG. 4B is a flow diagram illustrating learning (455) a feature-based function 457 using machine learning techniques according to alternative embodiments of the present invention. A wireless device or other suitable receiver receives (460) a waveform from which a distance estimate is prepared (470) and a feature vector is extracted (465). The extracted feature vector may include, but is not limited to: estimated distance between wireless devices; received energy; maximum amplitude of the received waveform; waveform rise time; mean excess delay; RMS delay spread; and kurtosis.

Evaluating (475) the feature vector using the feature-based function 457 produces an estimate of distance estimation error or a distribution of distance estimation error 477, which can be used to mitigate (480) error in the distance estimate. The mitigated distance estimate and the estimate of distance estimation error (and/or the distribution of distance estimation error) 477 are reported (485, 490) to a user, another wireless device or processor, or another layer in the wireless network.

Figure 5A:
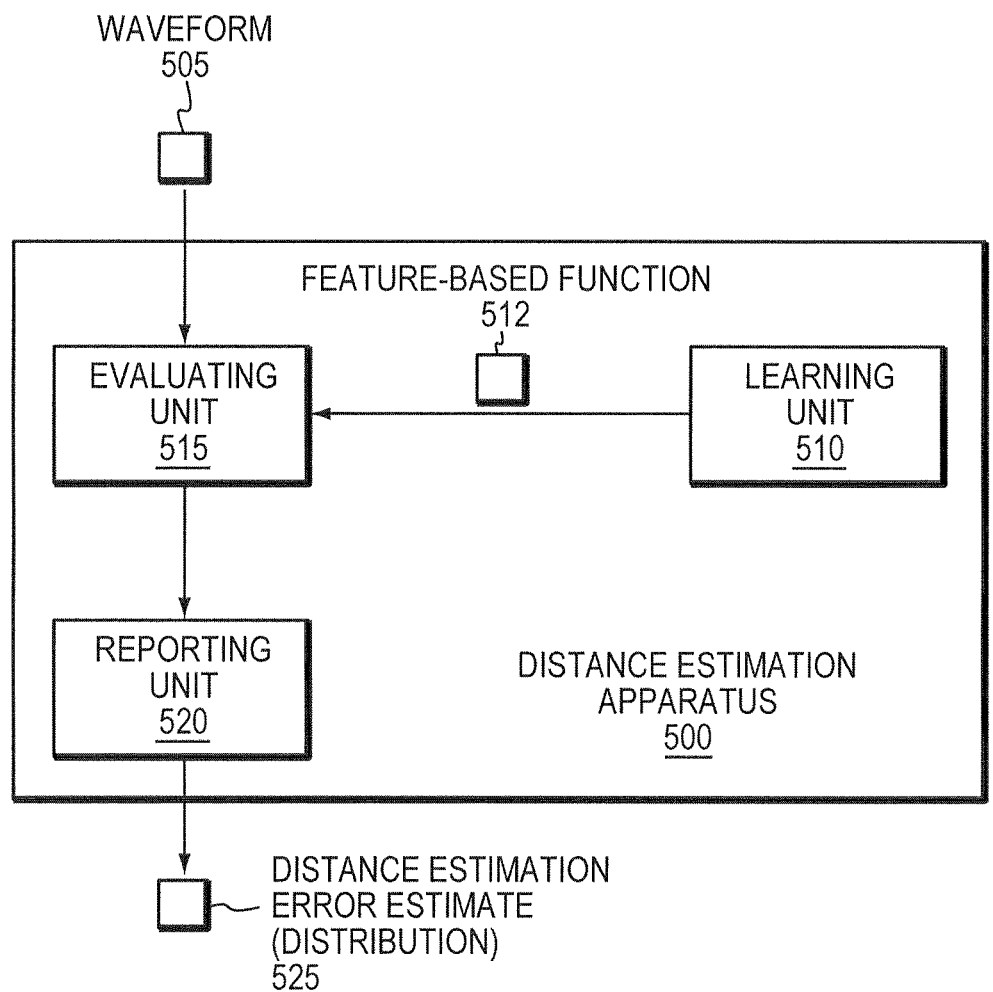
FIG. 5A is a block diagram illustrating a distance estimation apparatus according to embodiments of the present invention.

FIG. 5A is a block diagram illustrating a distance estimation apparatus 500 according to embodiments of the present invention. The distance estimation apparatus 500, which may operate according to the flow diagrams shown in FIGS. 4A and 4B, learns a feature-based function 512 with a learning unit 510 using machine learning techniques. The learning unit 510 forwards the learned nonparametric function 512 to an evaluating unit 515, which evaluates a feature vector extracted from a received waveform 505 using the feature-based function 512. The evaluating unit 512 produces an estimate of distance estimation error (or a distance estimation error distribution) 525 and forwards the error estimate (distribution) 525 to a reporting unit 520. The reporting unit 520 forwards the error estimate (distribution) 525 to a user, processor, different wireless device, or different layer in the wireless network through which the waveform 505 was transmitted.

Figure 5B:
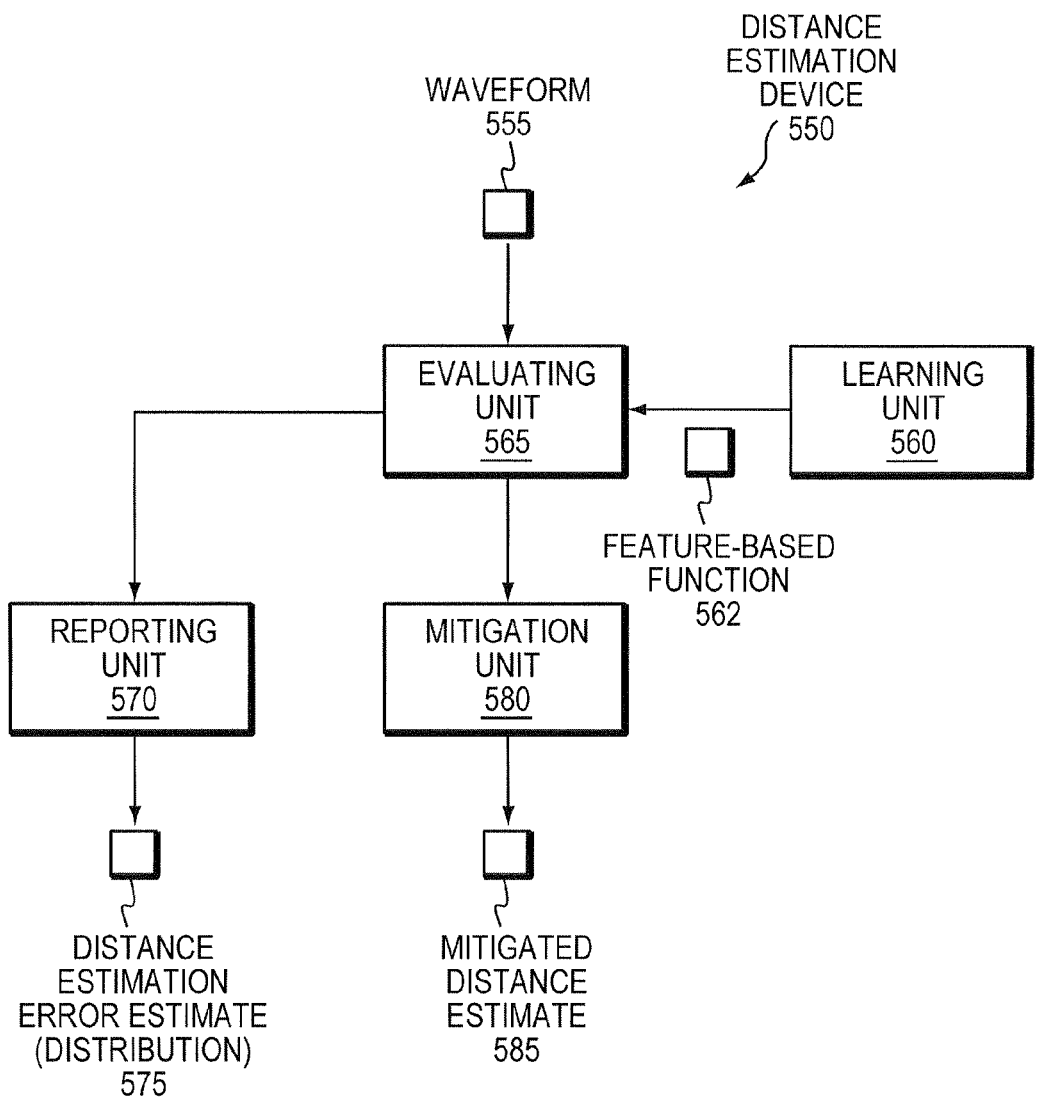
FIG. 5B is a block diagram illustrating an alternative distance estimation apparatus according to embodiments of the present invention.

FIG. 5B is a block diagram illustrating an alternative distance estimation apparatus 550 according to embodiments of the present invention. The distance estimation apparatus 550 receives a waveform 555, then extracts a feature vector from the received waveform. An evaluation unit 565 evaluates the feature vector with a feature-based function 562, learned by a learning unit 560 using machine learning techniques, such as SVMs and Gaussian processes. The evaluation unit 565 forwards distance estimation error information 575, such as error estimate or distribution, to a reporting unit 570, which reports the error information 575, and a mitigation unit 580. The mitigation unit 580 uses the error information 575 to mitigate error in estimated distance; the mitigation unit 580 then reports the mitigated distance estimate 585.

Figure 6A:
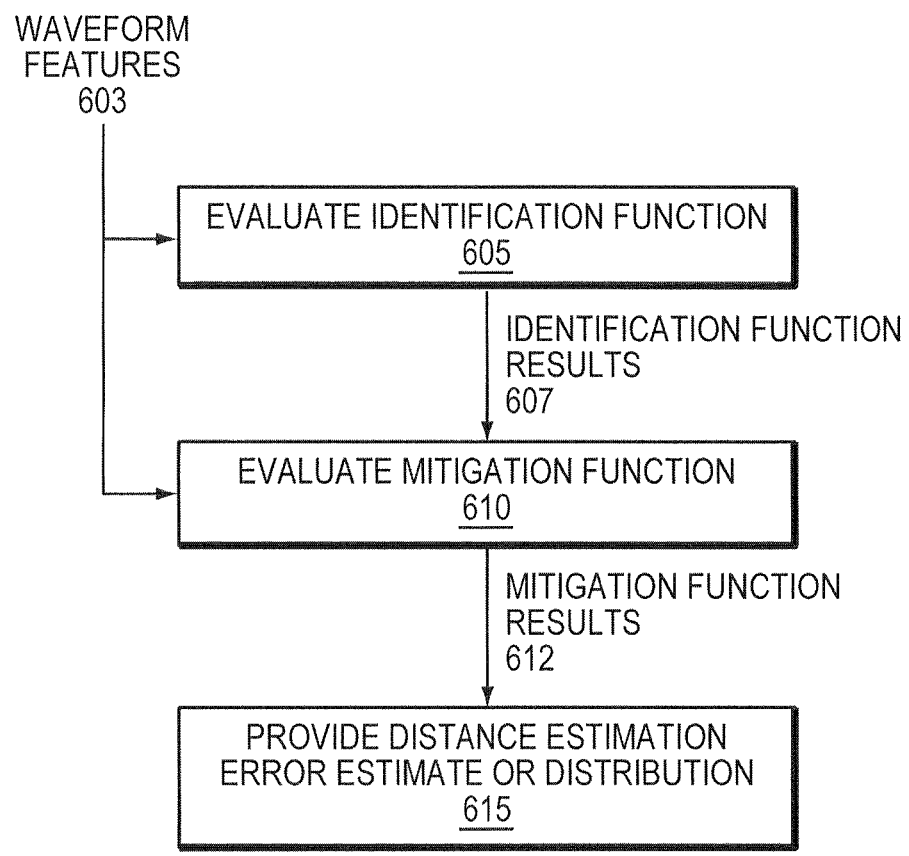
FIG. 6A is a flow diagram illustrating evaluating identification and mitigation functions to report estimates of distance estimation errors or distributions of distance estimation errors according to embodiments of the present invention.

FIG. 6A is a flow diagram illustrating evaluating identification (605) and mitigation (610) functions according to embodiments of the present invention. The identification function is evaluated using features 603 extracted from a received waveform. The features may be arranged in a feature vector and may include, but are not limited to: estimated distance between wireless devices; received energy; maximum amplitude of the received waveform; waveform rise time; mean excess delay; RMS delay spread; and kurtosis.

Next, the mitigation function is evaluated (610) using results 612 from evaluating (605) the identification function to produce, for example, an estimate of distance estimation error or a distribution of distance estimation errors. The mitigation function results 612 are then provided (615) to a user, wireless device, localization system, or different layer in the wireless network.

Figure 6B:
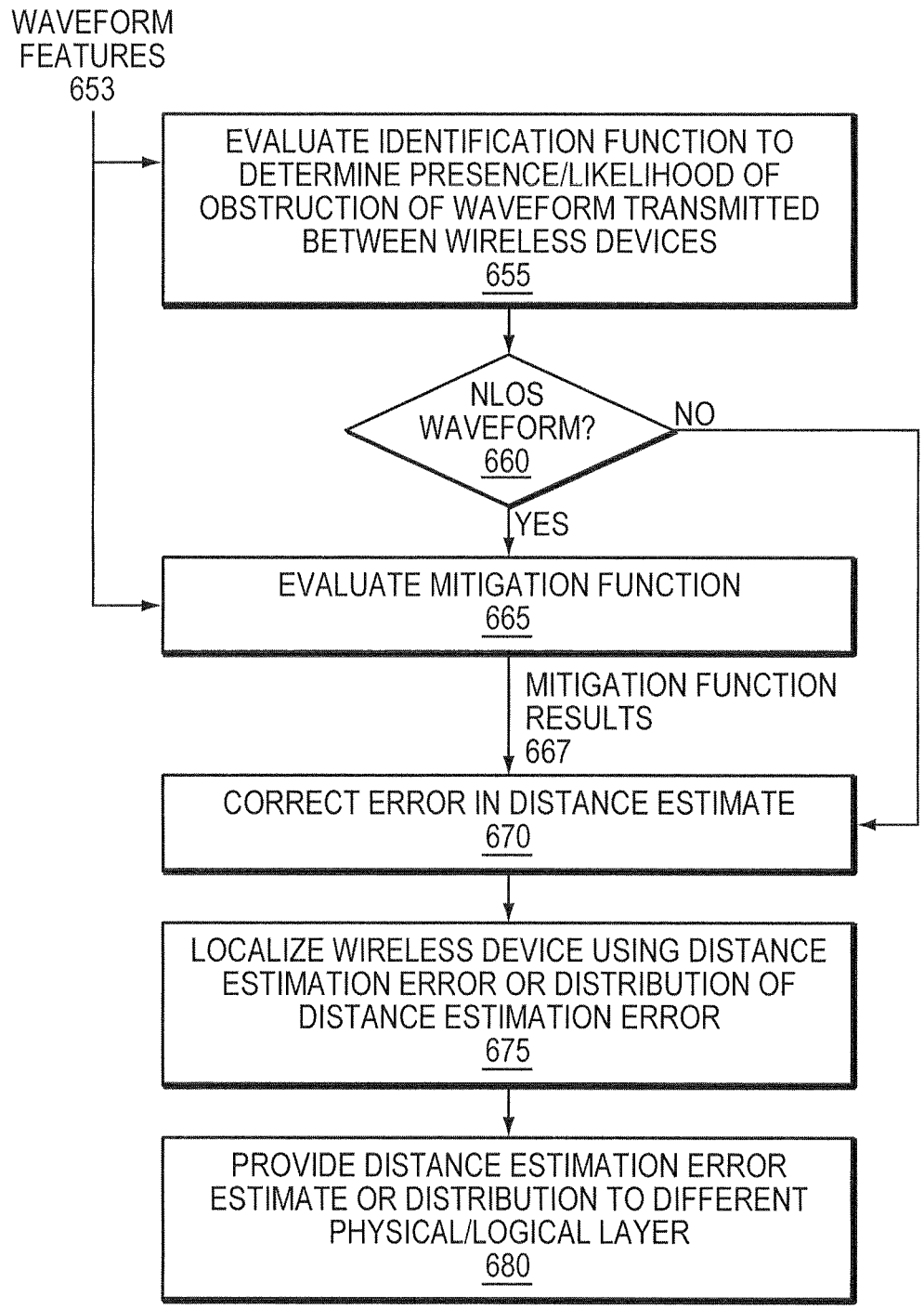
FIG. 6B is a flow diagram illustrating evaluating identification and mitigation functions to report estimates of distance estimation errors or distributions of distance estimation errors according to alternative embodiments of the present invention.

FIG. 6B is a flow diagram illustrating an alternative method of evaluating identification (655) and mitigation (665) functions, where the identification and mitigation functions are each functions of waveform features. The identification and mitigation functions may be separate functions learned using machine learning techniques, such as those described in greater detail below. The identification function may be learned using a database that includes LOS and NLOS labels of training waveforms, as described above. The mitigation function may be learned using true distances of received training waveforms, possibly stored in the same database used to learn the identification function. Each function may be learned once before evaluation (655).

The identification function is evaluated (655) using features 653 extracted from a received waveform to determine whether or not an obstruction exists between the pair of wireless devices associated with the received waveform. If evaluating (655) the identification function shows a strong likelihood that an obstruction exists, the waveform is identified as an NLOS waveform (660). Otherwise, the waveform is identified as an LOS waveform (660).

For NLOS waveforms, the mitigation function is evaluated (665) using results from evaluating (655) the identification function to produce, for example, an estimate of distance estimation error or a distribution of distance estimation errors. The mitigation function results 667 are then used to correct (670) error in the distance estimate. For example, positively biased offset errors may be subtracted from the distance estimate. In some embodiments, distance estimates for LOS waveforms may be corrected (670) without being mitigated (665).

The corrected distances estimates for both LOS and NLOS waveforms may then be used to localize (675) a wireless device within a wireless network. Localization (675) requires inputs from three or more devices (or three or more device locations) to triangulate the location of a given wireless device relative to other devices on the network. Using the estimate of distance estimation error or distribution of distance estimation error improves localization precision. Localization, error information, and distance estimates are then reported to a different layer in the network.

Figure 7A:
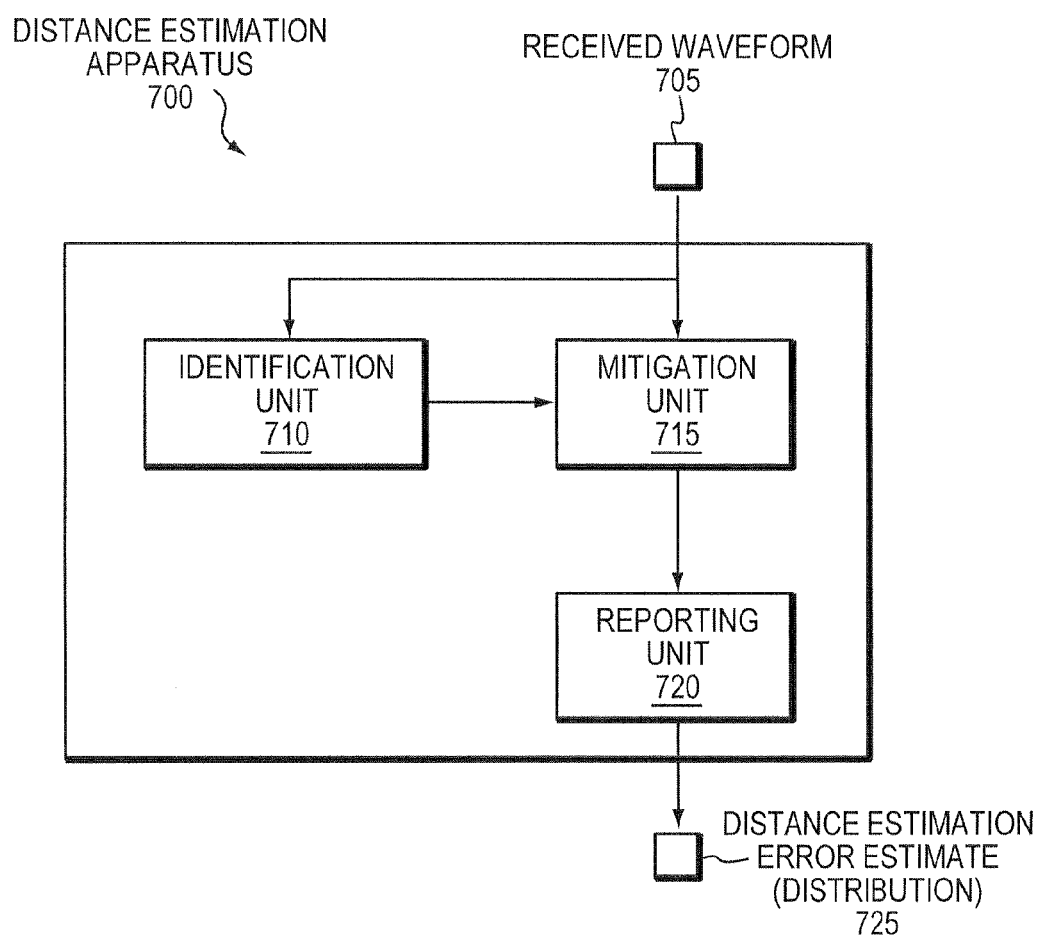
FIG. 7A is a block diagram illustrating a further alternative distance estimation apparatus according to embodiments of the present invention.

FIG. 7A is a block diagram illustrating a distance estimation apparatus 700 according to embodiments of the present invention. The distance estimation apparatus 700, which may operate according to the flow diagrams shown in FIGS. 6A and 6B, evaluates identification and mitigation functions teamed using machine learning techniques. An identification unit 710 and a mitigation unit 715 each evaluate a feature vector extracted from a received waveform 705. The mitigation unit 715 may condition its evaluation on data from the identification unit 710 to produce an estimate of distance estimation error (or a distance estimation error distribution) 725. The mitigation unit 715 and forwards the error estimate (distribution) 725 to a reporting unit 720, which forwards the error estimate (distribution) 725 to a user, processor, different wireless device, or different layer in the wireless network through which the waveform 705 was transmitted.

Figure 7B:
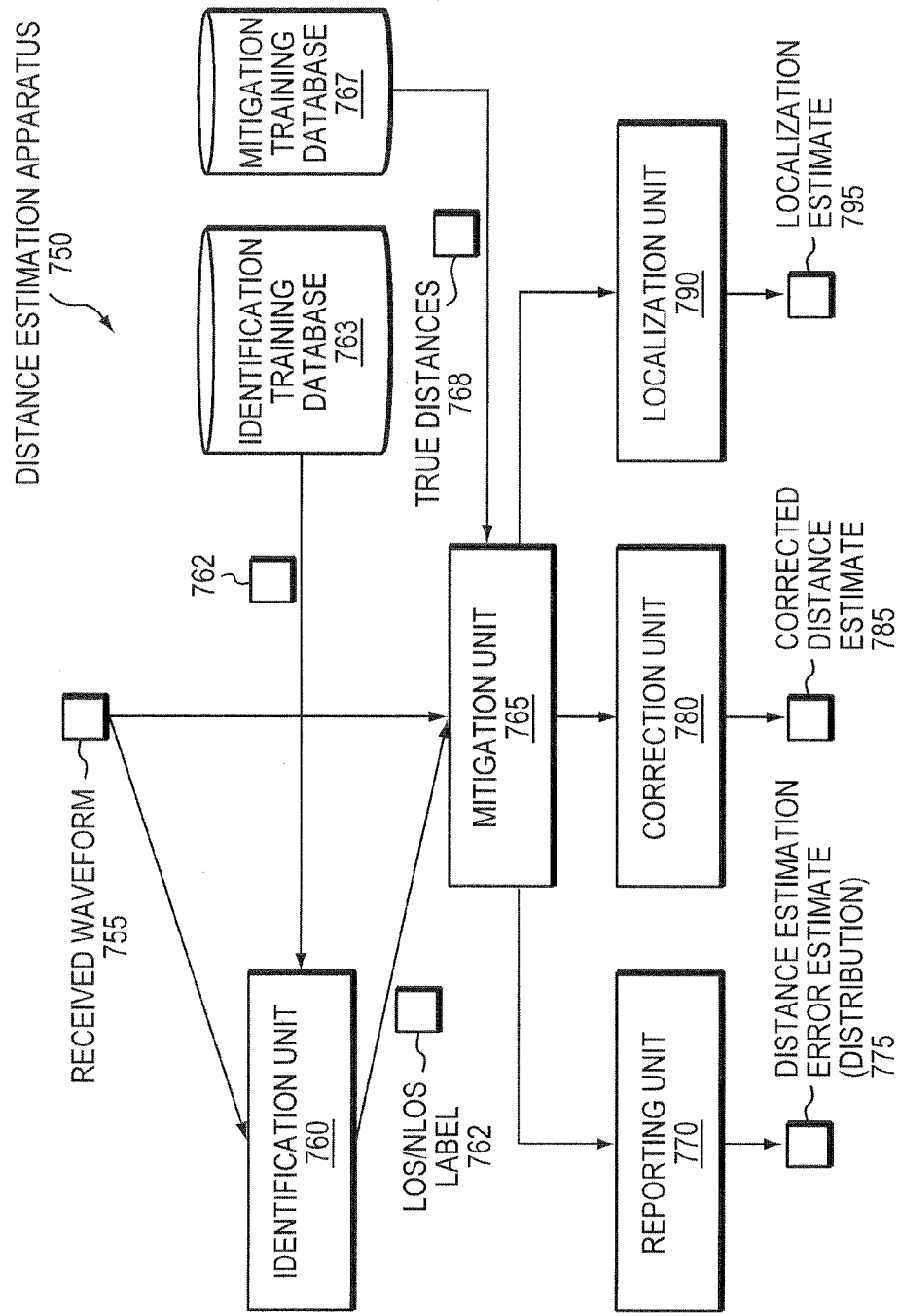
FIG. 7B is a block diagram illustrating yet another alternative distance estimation apparatus according to embodiments of the present invention.

FIG. 7B is a block diagram illustrating another alternative distance estimation apparatus 750, which may operate according to the flow diagrams shown in FIGS. 6A and 6B. The distance estimation apparatus 750 evaluates identification and mitigation functions learned using machine learning techniques, such as SVMs and Gaussian processes. The identification and mitigation functions may be learned using LOS/NLOS labels 762 and true distances 768, respectively, that are stored in an identification database 763 and a mitigation database 767, respectively. An identification unit 760 evaluates a feature vector extracted from a received waveform 755, then forwards an LOS/NLOS label 762 to a mitigation unit 765.

If the label 762 identifies the waveform 755 as an NLOS signal, the mitigation unit 765 mitigates NLOS effects, then forwards mitigated distance data to a reporting unit 770, a correction unit 780, and a localization unit 790. Otherwise, the mitigation unit 765 may forward raw distance data directly to units 770, 780, and 790. The reporting unit 770 reports estimates of distance estimation error (or a distributions of distance estimation error) 775; the correction unit 780 corrects error in the distance estimate to produce a corrected distance estimate 785; and the localization unit 790 localizes a wireless device associated with the waveform 755 using data from multiple devices or multiple device locations to produce a localization estimate 795.

Problem Statement and System Model

This section includes a description of ranging and localization and the corresponding need for NLOS identification and mitigation. A network consists of two types of nodes: anchors are nodes with known positions, while agents are nodes with unknown positions. For notational convenience, the focus here is from the point of view of a single agent, with unknown position p, surrounded by N anchors, with positions, $p_i$, i=1, ..., N. The distance between the agent and anchor i is denoted by $d_i=|p-p_i|$ and the agent's estimate of this distance by $\hat{d}_i$. The ranging error is $\epsilon_i=\hat{d}_i-d_i$, and its estimate is $\hat{\epsilon}_i$. The channel condition between the agent and anchor i is $\lambda_i \in \{LOS, NLOS\}$, and its estimate is $\hat{\lambda}_i$. The mitigated distance estimate of $d_i$ is $\hat{d}_i^m=\hat{d}_i-\hat{\epsilon}_i$. The ranging error after mitigation is defined as $\epsilon_i^m=\hat{d}_i^m-d_i$.

As shown below, localization requires knowledge of distance estimates and anchor positions. For that reason, a set of useful neighbors Γ consisting of couples ($p_i$, $\hat{d}_1$), can be useful.

Ranging Procedure

Suitable UWB radios include those that use a round-trip time of arrival (RTOA) method to perform ranging between two nodes without a common time reference: the first node, the requester, sends a ranging request to the second node, the responder. The ranging request consists of a packet with a time stamp $t_{Req,send}$ corresponding to the instant the request is sent. The value of $t_{Req,send}$ is expressed in the time reference of the requester. The responder receives the packet at time $t_{Req,rec}$ and sends a second packet back to the first node at time $t_{Res,send}=t_{Res,rev}+\Delta$. This packet is called a ranging response and contains information about the duration of the interval Δ. The requester receives the ranging response at time $t_{Req,rec}$ and is able to estimate the round-trip time using only its own internal clock reference:

$$\hat{d}_{Res-Req} = \frac{1}{2} \times v \times (t_{Req,rec} - t_{Req,send} - \Delta) \quad (1)$$

where v is the signal propagation speed. Typically, v is taken to equal c, the speed of light, but this becomes inaccurate under NLOS propagation.

Localization Procedure

Once the agent has estimated distances with respect to N≥3 anchor nodes, it can estimate its position using Γ={$p_i$, $\hat{d}_i$|1≤i≤N}. Many methods can achieve this goal, including the least squares (LS) technique, which is simple and requires no assumptions regarding ranging errors. The agent can infer its position by solving the LS cost function, $$\hat{p} = \underset{p}{\text{argmin}} \sum_{i=1}^{N} (\hat{d}_i - \|p - p_i\|)^2. \quad (2)$$

This optimization problem can be solved numerically using steepest descent. In particular, setting the derivative of the cost function with respect to p to zero leads to the following iterative procedure:

$$\hat{p}^{(l)} = \hat{p}^{(l-1)} + \delta \sum_{i=1}^{N} (\hat{d}_i - \|\hat{p}^{(l-1)} - p_i\|) e_i^{(l-1)} \quad (3)$$

where $e_i^{(l-1)}$ is a unit vector oriented from $p_i$ to $\hat{p}_i^{(l-1)}$ and δ is a step size controlling the convergence speed. Equation (3) can be interpreted as follows: every term in the summation is zero when the distance estimate $\hat{d}_i$ matches the distance between the estimates $\|\hat{p}_i^{(l-1)}-\hat{p}_i\|$. When the distance between the estimates is larger than the distance estimate, the LS procedure corrects this by moving the estimated position of the agent towards anchor i. Conversely, when the distance between the estimates is smaller than the distance estimate $\hat{d}_i$, the LS procedure corrects this by moving the estimated position of the agent away from anchor i.

Sources of Error

Localization leads to erroneous results when the ranging errors are large. In practice the estimated distances are not equal to the true distances, because of a number of effects, including thermal noise, multipath propagation, obstructions, and ranging artifacts. Additionally, the direct path between requester and responder may be obstructed, leading to NLOS signals. In NLOS conditions, the direct path is either attenuated, due to through-material propagation, or completely blocked. In the former case, the distance estimates are positively biased due to the reduced propagation speed (i.e., less than the expected c). In the latter case, the distance estimate is also positively biased, as it corresponds to the first reflected path. These bias effects can be accounted for in either the ranging phase or the localization phase.

Embodiments of the present invention include techniques that work during the ranging phase to identify and mitigate the effects of NLOS signals. In NLOS identification, the terms in Eq. (3) corresponding to NLOS distance estimates are omitted. In NLOS mitigation, the distance estimate corresponding to NLOS signals are corrected, resulting in a range estimate that is more accurate. The localization equation, Eq. (3), can then adopt different strategies, depending on the quality and the quantity of available range estimates.

Measurement Campaigns and Training Databases

Figure 8:
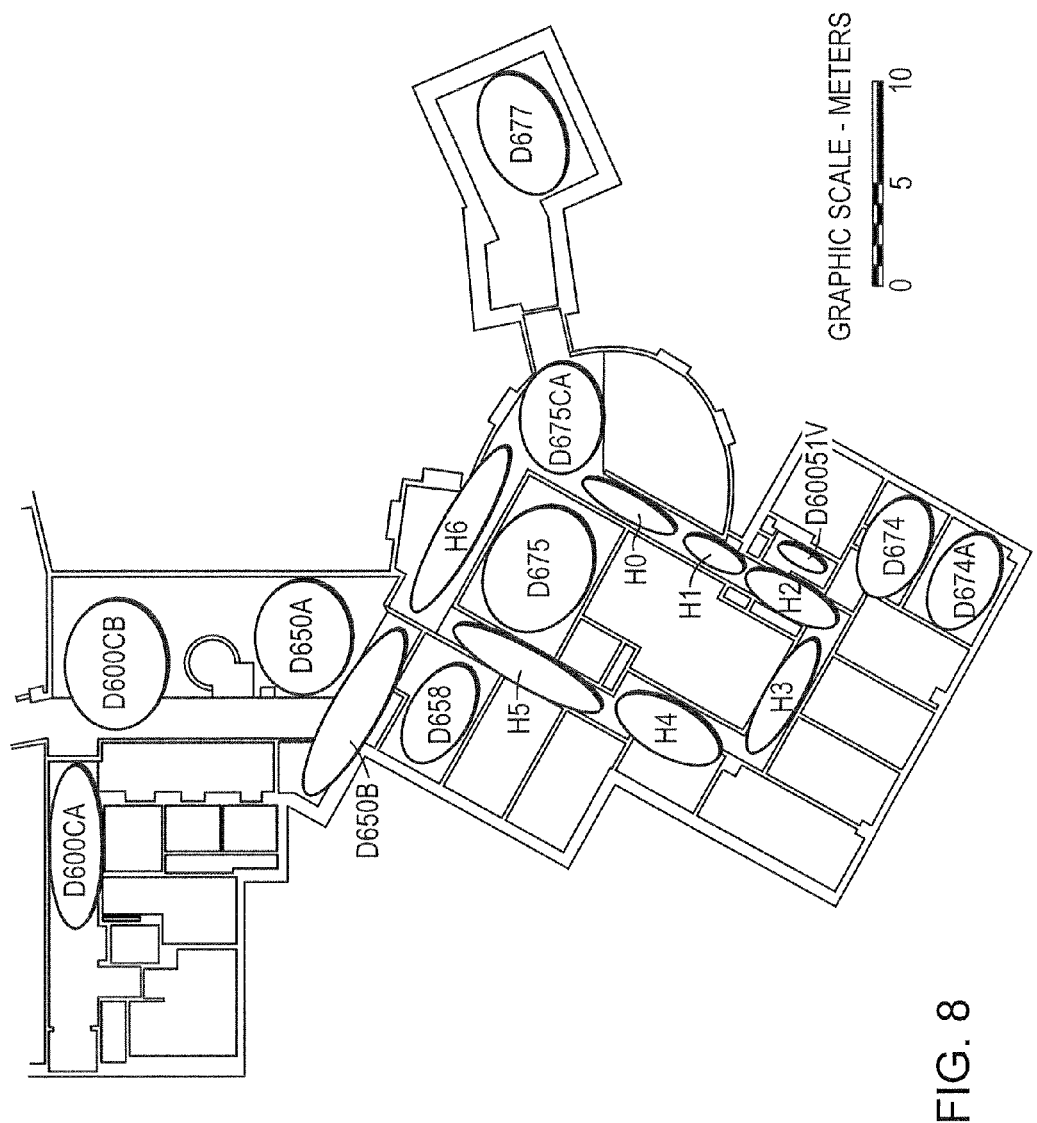
FIG. 8 is schematic diagram illustrating clusters throughout an office environment used for capturing training measurements between wireless devices under different signal propagation conditions.

FIG. 8 shows topological organization of clusters within an indoor office environment at the Massachusetts Institute of Technology that were used by the Wireless Communications Research Group for a UWB LOS/NLOS measurement campaign. As shown in FIG. 8, several offices, hallways, one laboratory, and a large lobby constituted the physical setting of this campaign. The scope of the campaign matched the so-called indoor office environment. The Wireless Communications Research Group conducted the measurement campaign by collecting waveforms sent from a wireless transmitter to a wireless receiver at a variety of positions and propagation conditions in the indoor office environment. The associated range estimate and the actual distance were also recorded for each waveform. The waveforms were then post-processed in order to reduce dependencies on the specific hardware.

The measurements were made using two Time Domain Corporation PulsOn 210 (P210) radios capable of performing communications and ranging using UWB signals. These radios are off-the-shelf transceivers that comply with the emission limit set forth by the FCC. Specifically, the 10 dB bandwidth spans the band from 3.1 GHz to 6.3 GHz. The P210 radio is equipped with a bottom-fed planar elliptical antenna known as the BroadSpec P200. This kind of dipole is well-matched and radiation efficient. Most importantly, the antenna is omni-directional and thus suited for ad-hoc networks with arbitrary azimuthal orientation. The radio runs a RTOA ranging protocol and is capable of capturing a waveform while performing the ranging procedure.

Measurements were take at over one hundred points in the considered area using radios, or nodes, mounted on top of plastic carts at a height of 90 cm above the ground. Points were placed randomly, but were restricted to areas which are accessible by the carts. The distance between the transmitter and receiver varied from roughly 0.6 m up to 18 m. In about half the positions, obstacles between the transmitter and receiver created NLOS conditions. The measurement points were grouped into clusters, as shown in FIG. 8, where a given cluster corresponds to a room or a region of a hallway. Each point belongs only to a single cluster. Overall, around one thousand point-to-point measurements were performed, including measurements within a single cluster and between neighboring clusters. For each pair of points, several received waveforms and distance estimates were recorded, along with the actual distance. During each measurement, the radios remained stationary and care was taken to limit movement of other objects in the nearby surroundings.

A database was created from measurements collected during the measurement campaign and used to develop and evaluate the proposed identification and mitigation techniques. The database included 1024 measurements: 512 LOS and 512 NLOS. The term LOS is used to denote the existence of a visual LOS. Specifically, a measurement is labeled as LOS when the straight line between the transmitting and receiving antenna is unobstructed. Each waveform r(t) is affected by thermal noise and sampled at $T_{sample}$=41.3 ps over an observation window of 190 ns. The ranging estimate was obtained by a RTOA process created by Time Domain Corp. and embedded on the radio. The actual position of the radio during each measurement was manually recorded, and the ranging error was calculated with the aid of a computer-aided design (CAD) software. The collected waveforms were then aligned in the delay domain using a simple threshold-based method for leading edge detection. The alignment process creates a common time reference which enables the subsequent extraction of the metrics used for identification and mitigation.

NLOS Identification and Mitigation

Figure 9:
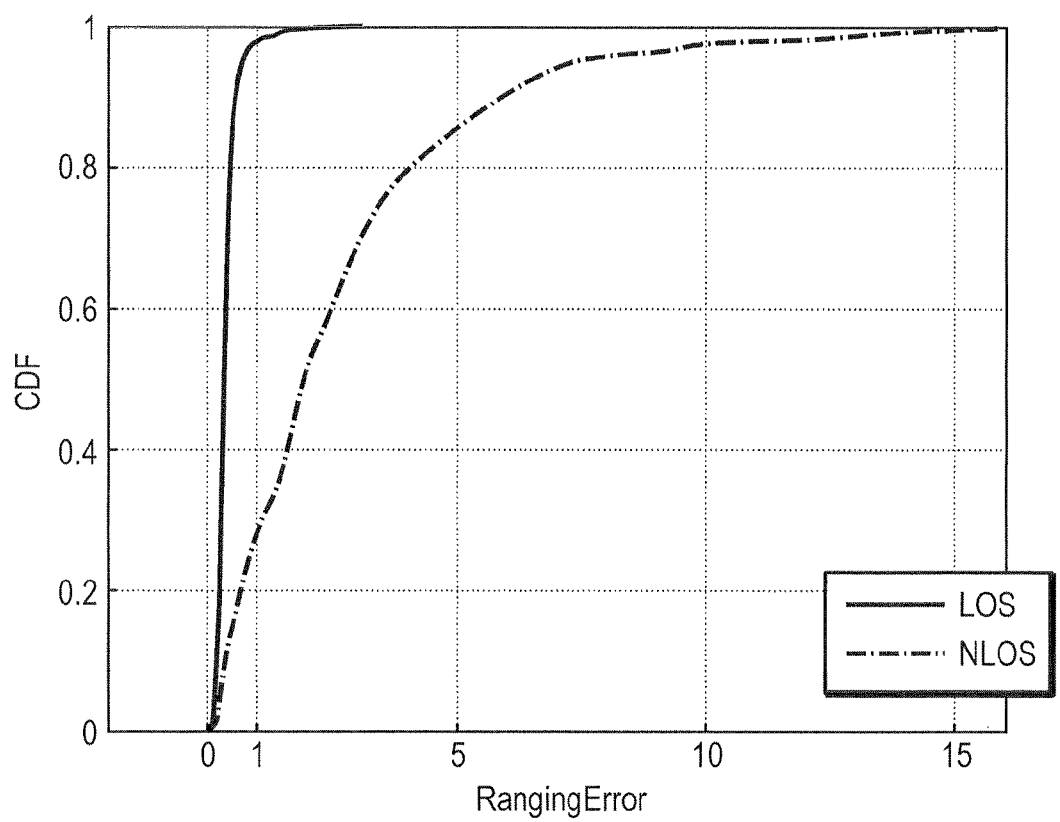
FIG. 9 is a plot illustrating a cumulative distribution function (CDF) of ranging error for line-of-sight (LOS) and NLOS conditions.

FIG. 9 shows the empirical cumulative distribution functions (CDFs) of the ranging error under the two different channel conditions. The collected measurement data shows that NLOS propagation conditions significantly impact ranging performance. In LOS conditions, the ranging error is less than a meter more than 95% of the time. In the NLOS case, on the other hand, the ranging error is less than a meter less than 30% of the time. Clearly, LOS and NLOS range estimates have very different characteristics.

FIGS. 10-14 show result of mitigation using techniques developed below to distinguish between LOS and NLOS situations and to mitigate the positive biases present in NLOS ranges estimates. The techniques include non-parametric techniques, and rely on least-squares support-vector machines (LS-SVM). The derivations below include a description of features used to distinguish between LOS and NLOS situations. This is followed by a brief introduction into LS-SVM and a description of how LS-SVM can be used for NLOS identification and mitigation in a localization application.

Figure 10:
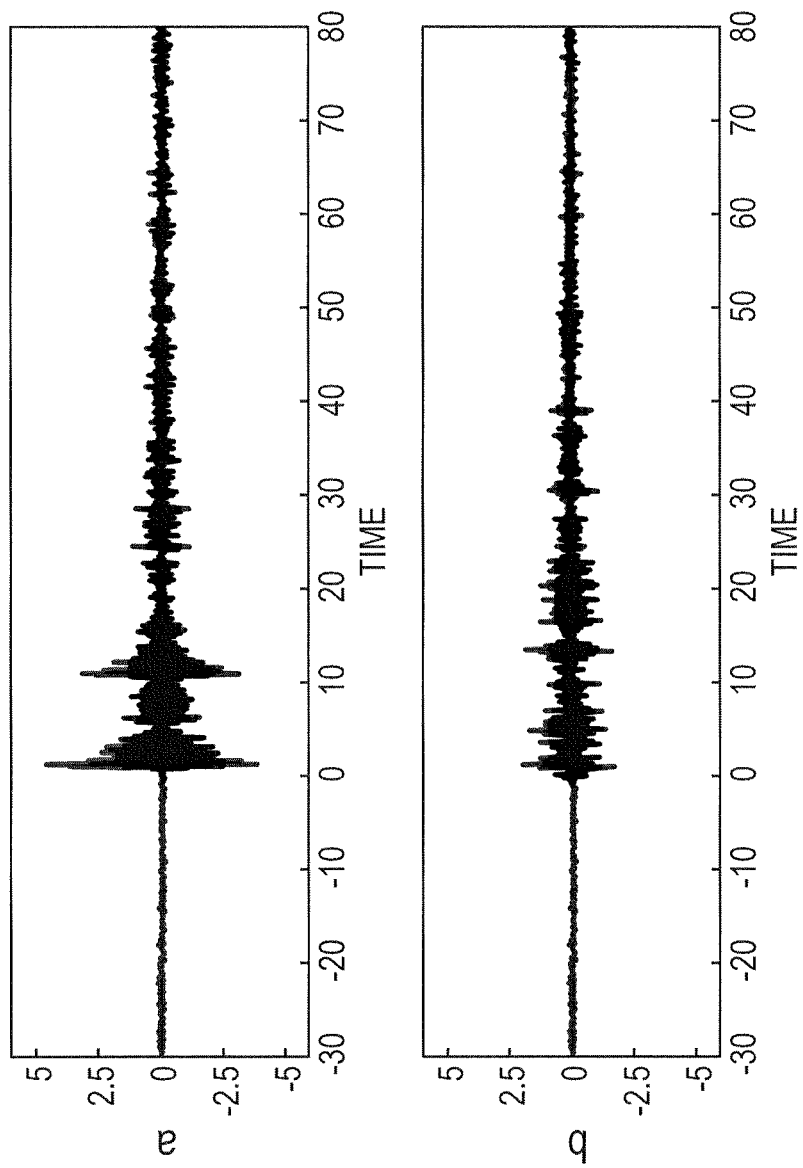
FIG. 10 is a pair of plots illustrating amplitudes of received LOS (upper plot) and NLOS (lower plot) signals.

FIG. 10 shows signals received under LOS (upper plot) and NLOS (lower plot) conditions. Although there is wide variation in signal characteristics, a number of features can be extracted from every received waveform r(t); these features (collectively, "a feature vector") capture the salient differences. In general, NLOS signals are considerably more attenuated and present smaller energy and amplitude due to reflections or obstructions. In the LOS case, the strongest path corresponds to the first path and the received signal presents a steep rise. In the NLOS case, some weak components precede the strongest path, resulting in a longer rise time. The RMS delay spread, which captures the temporal dispersion of the energy of the signal due to the multipath channel, is larger in NLOS signals.

Taking these considerations into account, the extracted features may include:

1. Energy of the received signal:

$$\varepsilon_r = \int_{-\infty}^{+\infty} |r(t)|^2 dt \qquad (4)$$

2. Maximum amplitude of the received signal:

$$r_{max} = \max_t |r(t)| \qquad (5)$$

3. Rise time:

$$t_{rise} = t_H - t_L \qquad (6)$$

where
$t_L = \min \{t: |r(t)| \geq \alpha \sigma_n\}$
$t_H = \min \{t: |r(t)| \geq \beta \tau_{max}\}$,
where $\sigma_n$ is the standard deviation of the thermal noise. The values of $\alpha > 0$ and $0 < \beta \leq 1$ are chosen empirically; here, $\alpha = 6$ and $\beta = 0.6$.

4. Mean excess delay:

$$\tau_{MED} = \int_{-\infty}^{+\infty} t\psi(t)dt \qquad (7)$$

where $\psi(t) = |r(t)|^2/E_r$.

5. RMS delay spread:

$$\tau_{RMS} = \int_{-\infty}^{+\infty} (t - \tau_m)^2 \psi(t) dt \qquad (8)$$

6. Kurtosis:

$$\kappa = \frac{\frac{1}{T}\int_T (|r(t)| - \mu_{|r|})^4 dt}{\sigma_{|r|}^4} \qquad (9)$$

where $\mu_{|r|} = (1/T)\partial_T |r(t)|dt$ and $\sigma_{|r|} = (1/T)\partial_T (|r(t)| \oplus \mu_{|r|})^2 dt$.

These features can be learned and evaluated with machine learning techniques, including support vector machines (SVMs), a supervised learning technique used both for classification and regression problems. SVMs are robust, have a rigorous underpinning, require few user-defined parameters, and have superior performance compared to other techniques, such as neural networks. LS-SVM is a low-complexity variation of the standard SVM that has been applied successfully to classification and regression problems.

Classification: A linear classifier is a function $\Box^n \to \{-1,+1\}$ of the form $$l(x) = \text{sign}[y(x)] \tag{10}$$

with $$y(x) = w^T \phi(x) + b \tag{11}$$

where $\phi(\cdot)$ is a predetermined function, and w and b are unknown parameters of the classifier. These parameters are estimated based on the training set $\{x_k, l_k\}_{k=1}^N$, with inputs $x_k \in \Box^n$ and labels $l_k \in \{-1,+1\}$.

The SVM classifier is a maximum-margin classifier, obtained by solving the following optimization problem:

$$\underset{w,b,\varepsilon}{\text{argmin}} \frac{1}{2}\|w\|^2 + \gamma \sum_{k=1}^N \xi_k \tag{12}$$

$$\text{s.t. } l_k y(x) \geq 1 - \xi_k; \forall k. \tag{13}$$

$$\xi_k \geq 0, \forall k, \tag{14}$$

where $\gamma$ controls the trade-off between minimizing training errors and model complexity. (The margin is given by $1/\|w\|$, and is defined as the smallest distance between the decision boundary $w^T \phi(x) + b = 0$ and any of the training samples $\phi(x_k)$.) The Lagrangian dual turns out to be a quadratic program (QP). The LS-SVM replaces the inequality in Eq. (13) by an equality:

$$\underset{w,b,e}{\text{argmin}} \frac{1}{2}\|w\|^2 + \gamma \frac{1}{2}\|e\|^2 \tag{15}$$

$$\text{s.t. } l_k y(x) \geq 1 - e_k, \forall k. \tag{16}$$

The Lagrangian dual is now a linear program (LP):

$$\begin{bmatrix} 0 & 1^T \\ 1 & \Omega + I/\gamma \end{bmatrix} \begin{bmatrix} b \\ \alpha \end{bmatrix} = \begin{bmatrix} 0 \\ 1_N \end{bmatrix} \tag{17}$$

where $\Omega$ is an N×N matrix with $\Omega_{kl} = y_k y_l K(x_k, x_l)$ where $K(x_k, x_l) = \phi(x_k)^T \phi(x_l)$ is the kernel function. Solving the LP given in Eq. (17) yields the LS-SVM classifier:

$$l(x) = \text{sign}\left[\sum_{k=1}^N \alpha_k l_k K(x, x_k) + b\right]. \tag{18}$$

Regression: A linear regressor is a function $\Box^n \to \Box$ of the form $$y(x) = w^T \phi(x) + b \tag{19}$$

where $\phi(\cdot)$ is a predetermined function, and w and b are unknown parameters of the regressor. These parameters are estimated based on the training set $\{x_k, l_k\}_{k=1}^N$, with inputs $x_k \in \Box^n$ and outputs $y_k \in \Box$. The LS-SVM regressor is obtained by solving the following optimization problem:

$$\underset{w,b,e}{\text{argmin}} \frac{1}{2}\|w\|^2 + \gamma \frac{1}{2}\|e\|^2 \tag{20}$$

$$\text{s.t. } y = y(x) + e_k; \forall k, \tag{21}$$

where $\gamma$ controls the trade-off between minimizing training errors and model complexity. The Lagrangian dual is again a LP:

$$\begin{bmatrix} 0 & 1^T \\ 1 & \Omega + I/\gamma \end{bmatrix} \begin{bmatrix} b \\ \alpha \end{bmatrix} = \begin{bmatrix} 0 \\ y \end{bmatrix} \tag{22}$$

with corresponding LS-SVM regressor $$y(x) = \sum_{k=1}^N \alpha_k K(x, x_k) + b, \tag{23}$$

where $\alpha$ and b are the solution of the linear system in Eq. (22).

Since it is not possible to determine parametric joint distributions of the features given above for LOS and NLOS conditions, embodiments of the present invention use non-parametric LS-SVM instead. A 10-fold cross-validation is used to assess the performance of the features and the SVM. This allows measurement of the performance of LS-SVM for certain features and for subsets of the available features.

Classification: A LS-SVM classifier is trained to distinguish between LOS and NLOS with inputs $x_k$ (for training examples k) and corresponding labels $l_k = +1$ when $\lambda_k = $ LOS and $l_k = -1$ when $\lambda_k = $ NLOS. The input $x_k$ is composed of a subset of the following features: energy of the received signal; the maximum amplitude of the received signal; rise time; mean excess delay; RMS delay spread; and kurtosis. A trade-off between classifier complexity and performance can be made by using a different size feature subset.

Regression: A LS-SVM regressor is trained to mitigate the effect of NLOS propagation with inputs $x_k$ (for training examples k, which were classified as being NLOS), and corresponding outputs $y_k = \epsilon_k$. Analogous to the classification case, $x_k$ is composed of the range estimate, $\hat{d}_k$, and a subset of the following features: energy of the received signal; the maximum amplitude of the received signal; rise time; mean excess delay; RMS delay spread; and kurtosis. Again, the performance achieved by the regressor depends on the size of the feature subset and the combination of features used.

Localization Strategies

The LS-SVM classifier and regressor allow development of the following localization strategies: i) localization via identification, where only classification is employed; ii) localization via identification and mitigation, where the received waveform is first classified and error mitigation is performed only on NLOS estimates; and iii) a hybrid approach which discards mitigated NLOS estimates when a sufficient number of LOS estimates are present.

In the standard strategy, all the range estimates $\hat{d}_i$ from neighboring anchor nodes are used by the LS procedure for localization. In other words, $$\Gamma_S = \{(p_i, \hat{d}_i) : 1 \leq i \leq N\}. \tag{24}$$

In the identification strategy, signals associated with range estimates are classified as LOS/NLOS using the LS-SVM classifier. Range estimates are used in localization only if the associated signal was classified as LOS, while NLOS signals are discarded:

$$\Gamma_I = \{(p_i, \hat{d}_i) : 1 \leq i \leq N, \hat{\lambda}_i = \text{LOS}\}. \quad (25)$$

Whenever the cardinality of $\Gamma_I$ is less than three, the agent is unable to localize. In this case, the localization error is set to $+\infty$. Note that measurements from three different points (e.g., three anchor nodes) are needed to localize an agent in two-dimensions.

The identification and mitigation strategy is an extension to the previous strategy, where the received signal is first classified as LOS or NLOS, and then mitigation is applied to those signals where $\hat{\lambda}_i = \text{NLOS}$. For this case $\Gamma_{IM} = \Gamma_I \cup \Gamma_M$ where $$\Gamma_M = \{(p_i, \hat{d}_i^m) : 1 \leq i \leq N, \hat{\lambda}_i = \text{NLOS}\}. \quad (26)$$

This approach is motivated by the observation that there is no need to mitigate LOS waveforms since their accuracy is already extremely high.

In the hybrid approach, range estimates are mitigated as in the previous strategy. However, mitigated range estimates are only used when less than three LOS anchors are available:

$$\Gamma_H = \begin{cases} \Gamma_I & \text{if } |\Gamma_I| \geq 3 \\ \Gamma_{IM} & \text{otherwise} \end{cases} \quad (27)$$

(In practice the angular separation of the anchors should be sufficiently large to obtain an accurate estimate. If this is not the case, more than three anchors may be needed.) This approach is motivated by the fact that mitigated range estimates are often still less accurate than LOS range estimates. Hence, only LOS range estimates should be used when they allow an unambiguous location estimate to be made.

Performance Evaluation and Discussion

This section includes quantification of the performance of the LS-SVM classifier and regressor and the four localization strategies given above. Identification is considered first, then mitigation, and finally localization. The relevant performance measures and quantitative details of how the results were obtained are provided for every technique.

TABLE I

FALSE ALARM PROBABILITY ($p_F$), PROBABILITY OF MISSED DETECTION (PM) AND OVERALL ERROR PROBABILITY ($P_{err}$) FOR DIFFERENT NLOS IDENTIFICATION TECHNIQUES. THE SET $S_i$ DENOTES THE SET OF i FEATURES WITH THE SMALLEST $P_{err}$.

| Identification Technique | $p_F$ | pM | $P_{err}$ |
|---|---|---|---|
| Parametric method | 0.184 | 0.143 | 0.164 |
| LS-SVM using features | 0.129 | 0.152 | 0.141 |
| LS-SVM $S_1 = \{r_{max}\}$ | 0.137 | 0.123 | 0.130 |
| LS-SVM $S_2 = \{r_{max}, t_{rise}\}$ | 0.092 | 0.109 | 0.100 |
| LS-SVM $S_3 = \{\epsilon_r, t_{rise}, \kappa\}$ | 0.082 | 0.090 | 0.086 |
| LS-SVM $S_4 = \{\epsilon_r, r_{max}, t_{rise}, \kappa\}$ | 0.082 | 0.090 | 0.086 |
| LS-SVM $S_5 = \{\epsilon_r, r_{max}, t_{rise}, \tau_{MED}, \kappa\}$ | 0.086 | 0.090 | 0.088 |
| LS-SVM $S_6 = \{\epsilon_r, r_{max}, t_{rise}, \tau_{MED}, \tau_{RMS}, \kappa\}$ | 0.092 | 0.090 | 0.091 |

Table 1 shows false alarm probability ($p_F$) probability of missed detection ($p_M$) and overall error probability ($P_{err}$) for different NLOS identification techniques and feature set sizes. The set $S_i$ denotes the set of i features with the smallest $P_{err}$. The kernel used here is a radial basis function (RBF) kernel of the form $K(x, x_k) = \exp(-\|x-x_k\|^2)$. The training error/model complexity tradeoff is set to $\gamma = 0.1$. Features are first converted to the log domain to reduce the dynamic range.

For the sake of comparison, the performance of the parametric identification technique from I. Guvenc et al., "NLOS identification and weighted least-squares localization for UWB systems using multipath channel statistics," *EURASIP J. on Advances in Signal Processing*, vol. 2008, 2008. This reference relies on the mean excess delay, the RMS delay spread, and the kurtosis of the waveform. For fair comparison, these features are extracted from the training database described above. The performance is measured in terms of the misclassification rates $P_{err} = (p_F + p_M)/2$, where $p_F$ is the false alarm probability (i.e., deciding NLOS when the signal was LOS), and $p_M$ is the miss probability (i.e., deciding LOS when the signal was NLOS).

LS-SVM significantly reduces the false alarm probability, compared to the parametric approach. The best set of features reduces the miss probability and achieves a total correct classification rate of above 90%, compared to roughly 85% of the time for the parametric approach. The feature set of size three provides the best performance. It turns out that among all feature sets of size three (results not shown), six sets yield roughly equal $P_{err}$. All six of these sets contained rise time ($t_{rise}$), while four contained maximum amplitude ($r_{max}$), indicating that these two features play an important role. This is also corroborated by the presence of maximum amplitude and rise time in the selected sets listed in Table 1.

TABLE II

MEAN OF RESIDUAL RANGING ERROR AND AVERAGE SQUARED RESIDUAL RANGING ERROR FOR LS-SVR MITIGATION. THE SET $S_i$ DENOTES THE SET OF i FEATURES WHICH ACHIEVES THE MINIMUM RMS RRE.

| Mitigation Technique with LS-SVR | mean [m] | RMS RRE [m] |
|---|---|---|
| No Mitigation | 2.6322 | 3.589 |
| $S_1 = \{\hat{d}\}$ | −0.0004 | 1.718 |
| $S_2 = \{\kappa, \hat{d}\}$ | −0.0042 | 1.572 |
| $S_3 = \{t_{rise}, \kappa, \hat{d}\}$ | 0.0005 | 1.457 |
| $S_4 = \{t_{rise}, \tau_{MED}, \kappa, \hat{d}\}$ | 0.0029 | 1.433 |
| $S_5 = \{\epsilon_r, t_{rise}, \tau_{MED}, \kappa, \hat{d}\}$ | 0.0131 | 1.425 |
| $S_6 = \{\epsilon_r, t_{rise}, \tau_{MED}, \tau_{RMS}, \kappa, \hat{d}\}$ | 0.0181 | 1.419 |
| $S_7 = \{\epsilon_r, r_{max}, t_{rise}, \tau_{MED}, \tau_{RMS}, \kappa, \hat{d}\}$ | 0.0180 | 1.425 |

Table 2 shows means of residual ranging error (RRE) and average squared RRE for LS-SVM mitigation, including results for different feature set sizes. The performance is measured in terms of the RMS RRE, $$\sqrt{1/N \sum_{i=1}^{N} (\varepsilon_i^m)^2}.$$

The set $S_i$ denotes the set of i features which achieves the minimum RMS RRE. The kernel used here is $K(x, x_k) = \exp(-\|x-x_k\|^2/256)$. The training error/model complexity tradeoff is set to $\gamma = 10$. Features are first converted to the log domain to reduce the dynamic range.

A detailed analysis of the experimental data indicates that large range estimates are likely to exhibit large positive ranging errors. This means that $\hat{d}$ is a useful feature by itself, as confirmed by the table. Increasing the feature set size can further improve the RMS RRE. The feature set of size six (energy; maximum amplitude; rise time; mean excess delay; RMS delay spread; and kurtosis) offers the best performance. FIGS. 11-14 show NLOS mitigation results achieved with feature set of size six.

Figure 11:
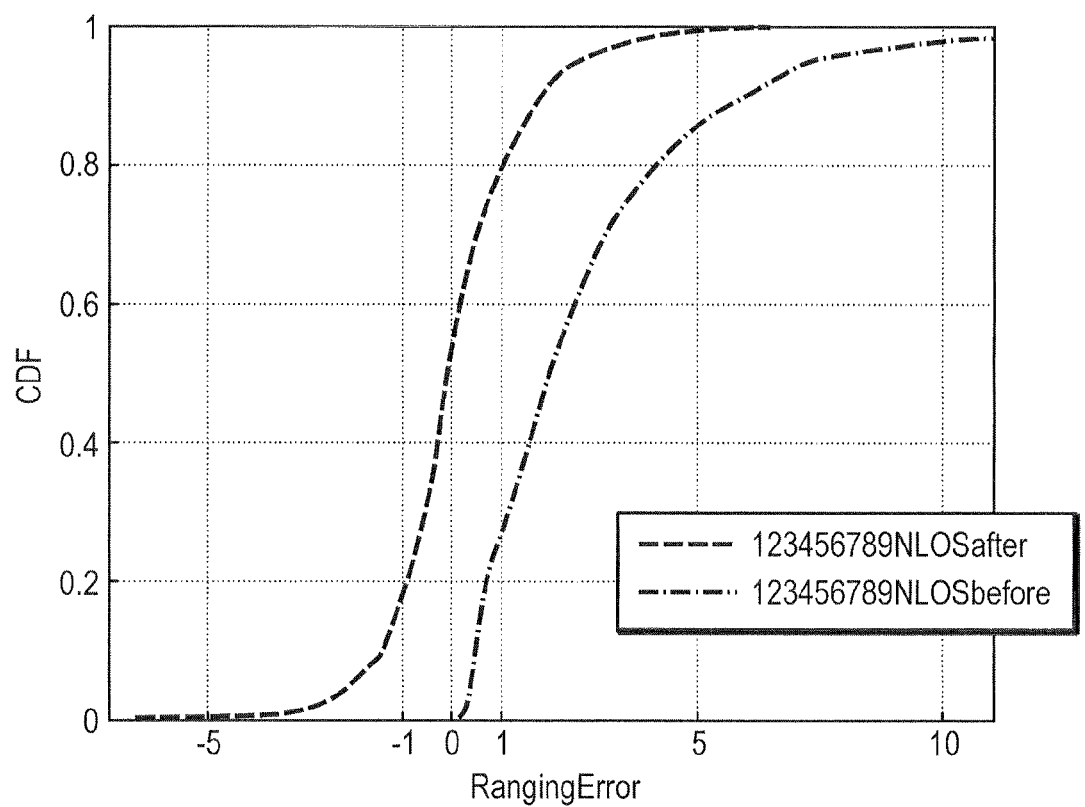
FIG. 11 is a CDF of ranging error for NLOS propagation condition before (dotted/dashed line) and after (dashed line) mitigation according to embodiments of the present invention.

FIG. 11 shows the CDF of the ranging error before and after mitigation using this feature set. Without mitigation, around 30% of the NLOS waveforms achieved an accuracy of less than one meter ($|\epsilon|<1$). However, after the mitigation process, 60% of the cases have an accuracy less than 1 m.

Simulation Setup:

The localization performance for varying number of anchors (N) and a varying probability of NLOS condition $0 \leq P_{NLOS} \leq 1$ is evaluated with an agent at a position p=(0, 0). For every anchor i ($1 \leq i \leq N$), a waveform is drawn from the training databases: waveforms are drawn from the NLOS database with probability $P_{NLOS}$ and drawn from the LOS database with probability $1-P_{NLOS}$. The true distance $d_i$ corresponding to that waveform are then used to place the ith anchor at position $p_i = \{d_i \sin[2\pi(i-1)/N], d_i \cos[2\lambda(i-1)/N]\}$, while the estimated distance $\hat{d}_i$ is provided to the agent. The agent estimates its position, based on a set of useful neighbors $\Gamma$, using the LS procedure given above, with the median of the anchor positions as the initial position estimate $\hat{p}^{(0)}$.

Performance Measure:

The notion of outage probability is useful for capturing the accuracy and availability of localization. For certain scenarios (N and $P_{NLOS}$) and certain allowable errors (say, $e_{th}=2$ m), the agent is said to be in outage when its position error $\|p-\hat{p}\|$ exceeds $e_{th}$. The outage probability is then given by $$P_{out}(e_{th}) = \mathbb{E}\{\mathrm{II}\{\|p-\hat{p}\|>e_{th}\}\} \qquad (28)$$

where I{P} is the indicator function, which, for a proposition P, is zero when P is false and one otherwise. The expectation in Eq. (28) is evaluated through Monte Carlo simulations.

Figure 12:
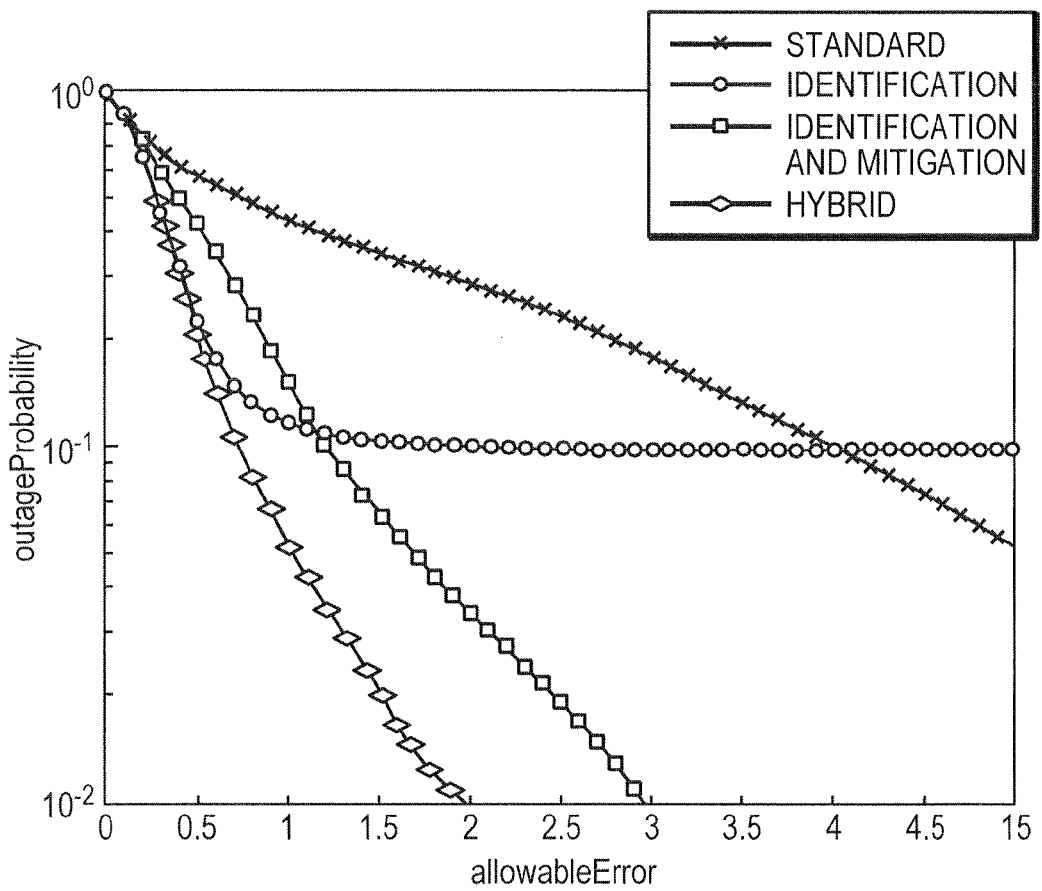
FIG. 12 is a plot of outage probability for an example NLOS identification and mitigation system with five anchors, where the probability of a NLOS condition between anchors is 20%.
Figure 13:
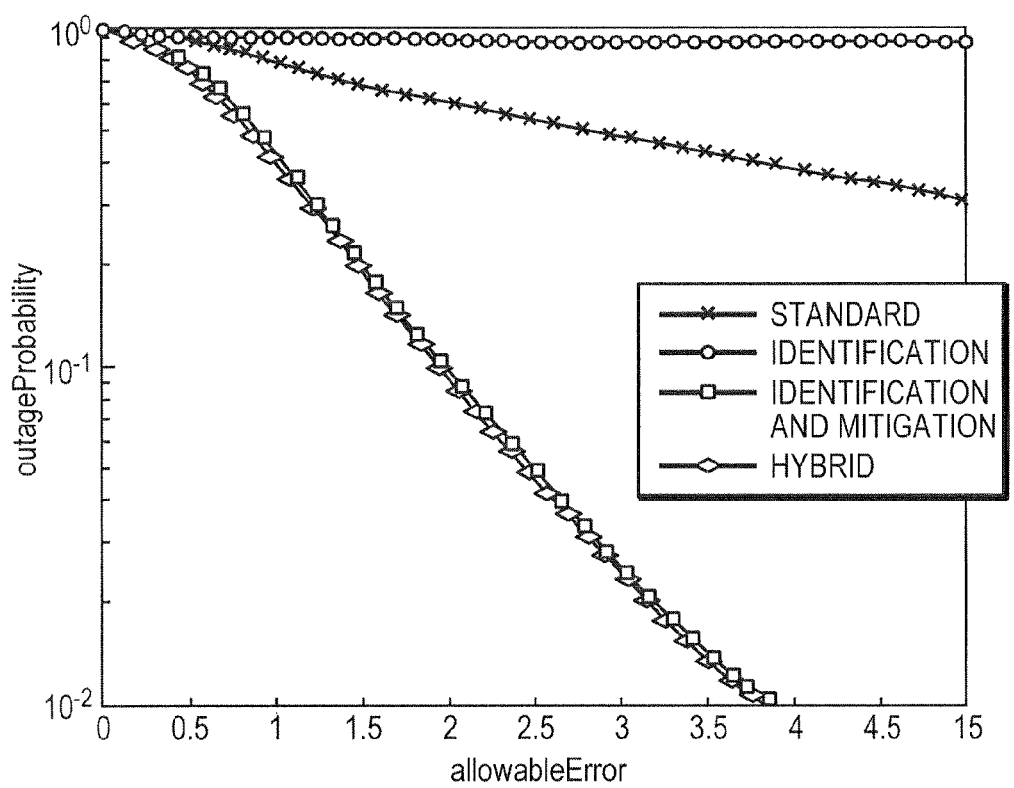
FIG. 13 is a plot of outage probability for an example NLOS identification and mitigation system with five anchors, where the probability of a NLOS condition between anchors is 80%.

Results:

FIGS. 12 and 13 show outage probability as a function of the allowable error $e_{th}$ for the different localization methods using the simulation setup described above evaluated with N=5 anchors for different values of $P_{NLOS}$. When $P_{NLOS}=0.2$ (FIG. 12), on average one anchor is NLOS, possibly deteriorating the performance. When identification is employed, only the reliable LOS anchors are used. The standard strategy suffers from performance degradation compared to the identification strategy. The identification strategy does lead to an error floor phenomenon, due to the fact that the probability that less than three LOS anchors are available is approximately 0.06.

Identification with mitigation does not suffer from the error floor, since all the anchors are used, but leads to some performance degradation for allowable errors below 1.5 m. The hybrid approach combines the benefits of the previous two strategies and leads to the lowest outage probability at all allowable errors. When $P_{NLOS}=0.8$ (FIG. 13), the identification strategy does not perform well, since the probability that less than three LOS anchors are available is approximately 0.94.

The standard strategy does not fare much better, and both are outperformed by the identification and mitigation strategy. Again, the hybrid strategy leads to the best performance. As $P_{NLOS} \rightarrow 1$, the latter two strategies have very similar performance because most of the anchors tend to an NLOS condition, so that $\Gamma_H \approx \Gamma_{IM}$.

Figure 14:
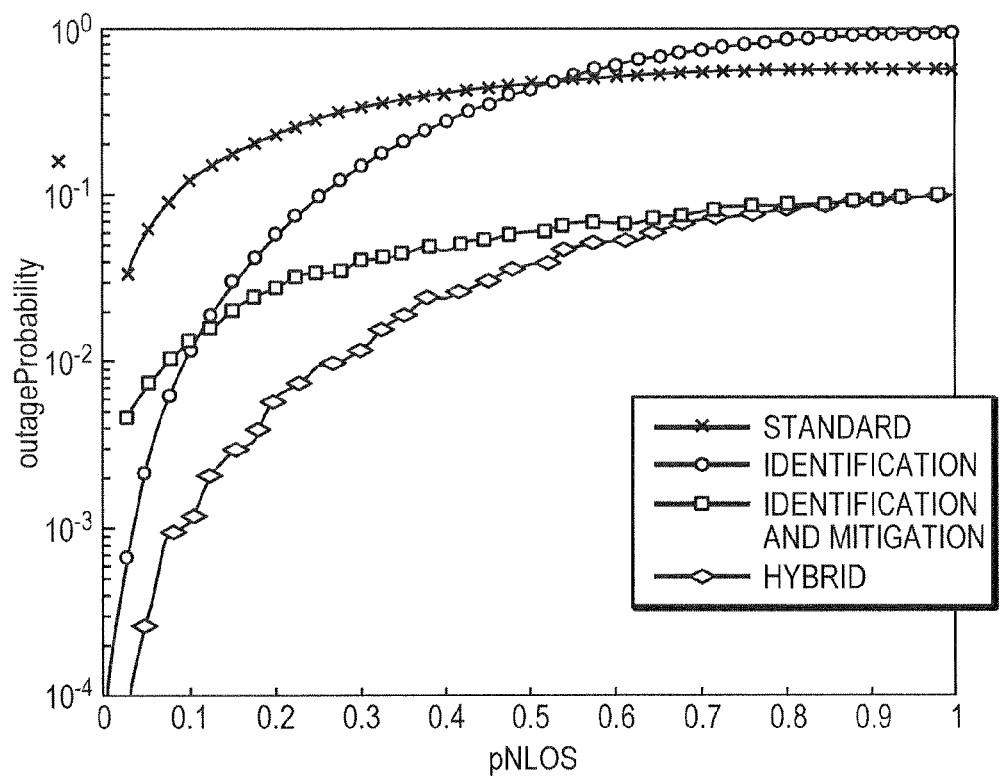
FIG. 14 is a plot of outage probability for an example NLOS identification and mitigation system with five anchors and a fixed allowable position error of $e_{th}$=2 m.

FIG. 14 shows outage probability for a fixed value of error, $e_{th}=2$, as a function of $P_{NLOS}$. The Identification strategy is useful only when $P_{NLOS}$ is very small, due to the error floor phenomenon. Identification with mitigation drastically improves the performance, and gives outages below 20%, even when all the anchors are in NLOS. The hybrid approach can further improve the performance, especially when a significant fraction of anchors are in LOS conditions.

It should be readily appreciated by those of ordinary skill in the art that the aforementioned blocks are merely examples and that the present invention is in no way limited to the number of blocks or the ordering of blocks described above. For example, some of the illustrated flow diagrams may be performed in an order other than that which is described. It should be appreciated that not all of the illustrated flow diagrams is required to be performed, that additional flow diagram(s) may be added, and that some may be substituted with other flow diagram(s).

It should also be apparent that methods involved in the invention may be embodied in a computer program product that includes a computer readable medium. For example, such a computer readable medium may be a read-only memory device, such as a CD-ROM disk or convention ROM devices, or a random access memory, such as a hard drive device, computer diskette, or memory having a computer readable program code stored thereon. The computer may load the program code and execute it to perform some or all of the example operations described herein or equivalents thereof.

While this invention has been particularly shown and described with references to example embodiments thereof, it will be understood by those skilled in the art that various changes in form and details may be made therein without departing from the scope of the invention encompassed by the appended claims.

What is claimed is:

1. A method of characterizing a waveform path, by an electronic device, the method comprising:
    accessing training data in a training database assembled from waveforms transmitted between at least one pair of training wireless devices, the training database including line-of-sight and non-line-of-sight labels and feature vectors representing aspects of the waveforms transmitted between the training wireless devices;
    learning a function using the training data, the function being nonparametric with respect to features representing aspects of a waveform transmitted via the waveform path between a first wireless device and a second wireless device;
    by the electronic device, characterizing the waveform path by evaluating the function learned with a feature vector extracted from the waveform received at the first wireless device from the second wireless device to make a decision regarding a presence of an obstruction between the first and second wireless devices or to determine a likelihood of an obstruction between the first and second wireless devices; and
    reporting the determined decision or likelihood of an obstruction between the first and second wireless devices to a device accessible to a user, another wireless device, or a different physical or logical layer in a wireless network including multiple wireless devices.

2. The method as claimed in claim 1 wherein learning the function includes using machine learning techniques by performing support vector machine (SVM) or Gaussian processes.

3. The method as claimed in claim 1 wherein the function is chosen from a class of functions including: polynomials and linear combinations of kernel functions.

4. The method as claimed in claim 1 wherein the first and second wireless devices are matched pairs of wireless devices employing compatible transceivers.

5. The method as claimed in claim 1 wherein the features representing aspects of a waveform include: estimated distance; energy of a received signal; maximum amplitudes; rise time; mean excess delay; root-mean-square delay spread; and kurtosis.

6. An apparatus for characterizing a waveform path, the apparatus comprising:
   a training database with training data, the training database being assembled from waveforms transmitted between at least one pair of wireless devices, the training database being configured to provide line-of-sight and non-line-of-sight labels and feature vectors representing aspects of waveforms transmitted between the training wireless devices to a learning unit;
   the learning unit configured to learn a function using the training data, the function being nonparametric with respect to features representing aspects of a waveform transmitted via the waveform path between a first wireless device and a second wireless device;
   an evaluating unit configured to characterize the waveform path by evaluating the function learned with a feature vector extracted from the waveform received at the first wireless device from the second wireless device to make a decision regarding a presence of an obstruction between the first and second wireless devices or to determine a likelihood of an obstruction between the first and second wireless devices; and
   a reporting unit configured to report the decision or likelihood of an obstruction between the first and second wireless devices to a device accessible to a user, another wireless device, or a different physical or logical layer in a wireless network including multiple wireless devices.

7. The apparatus as claimed in claim 6 wherein the learning unit learns the function uses machine learning techniques including: support vector machine techniques and Gaussian processes techniques.

8. The apparatus as claimed in claim 6 wherein the function is chosen from a class of functions including: polynomials and linear combinations of kernel functions.

9. The apparatus as claimed in claim 6 wherein the first and second wireless devices are matched pairs of wireless devices employing compatible transceivers.

10. The apparatus as claimed in claim 6 wherein the features representing aspects of a waveform include: estimated distance; energy of a received signal; maximum amplitudes; rise time; mean excess delay; root-mean-square delay spread; and kurtosis.

11. The method as claimed in claim 1 further comprising positioning the training wireless devices in a model environment representative of a real-world environment to obtain the training data.

12. The apparatus as claimed in claim 6 wherein the training wireless devices are positioned in a model environment representative of a real-world environment to obtain the training data.

13. The method of claim 1 wherein characterizing the waveform path yields information about the waveform.

14. The apparatus of claim 6 wherein characterizing the waveform path yields information about the waveform.

15. The method of claim 1 wherein learning the function further includes choosing the function from a class of functions including polynomials and linear combinations of kernel functions.

16. The apparatus of claim 6 wherein learning the function further includes choosing the function from a class of functions including polynomials and linear combinations of kernel functions.

* * * * *